(12) United States Patent
Sumioka

(10) Patent No.: US 11,646,678 B2
(45) Date of Patent: May 9, 2023

(54) CONTROL DEVICE FOR VIBRATION-TYPE ACTUATOR, VIBRATION-TYPE DRIVE DEVICE INCLUDING VIBRATION-TYPE ACTUATOR AND CONTROL DEVICE, AND ELECTRONIC APPARATUS USING MACHINE LEARNING

(71) Applicant: CANON KABUSHIKI KAISHA, Tokyo (JP)

(72) Inventor: Jun Sumioka, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 16 days.

(21) Appl. No.: 17/510,064

(22) Filed: Oct. 25, 2021

(65) Prior Publication Data

US 2022/0131480 A1    Apr. 28, 2022

(30) Foreign Application Priority Data

Oct. 28, 2020    (JP) .............................. JP2020-180168

(51) Int. Cl.
*H02N 2/06*    (2006.01)
*H02N 2/02*    (2006.01)

(52) U.S. Cl.
CPC ............. *H02N 2/062* (2013.01); *H02N 2/026* (2013.01)

(58) Field of Classification Search
None
See application file for complete search history.

(56) References Cited

U.S. PATENT DOCUMENTS 9,715,124 B2 *   7/2017   Sumioka ............ H04N 5/23287
2018/0181089 A1 *   6/2018   Fuji ...................... G05B 13/042

FOREIGN PATENT DOCUMENTS

JP    2016144262 A    8/2016

* cited by examiner

*Primary Examiner* — Emily P Pham
(74) *Attorney, Agent, or Firm* — Canon U.S.A., Inc. IP Division

(57) ABSTRACT

A control device for a vibration-type actuator includes a control unit including first and second output units. The first output unit includes a first learned model subjected to machine learning in such a way as to output a first control amount for causing the contact body to relatively move with respect to the vibrator. The second output unit includes a second learned model subjected to machine learning in such a way as to output a second control amount, which is data of the same data format as that of the first control amount. The control unit updates parameters of the first learned model and parameters of the second learned model based on a control deviation, which is a difference between the first control amount and the second control amount output within the same sampling period as that of the first control amount.

20 Claims, 21 Drawing Sheets

SIGMOID FUNCTION IN LAYER H

LINEAR FUNCTION IN LAYER Z

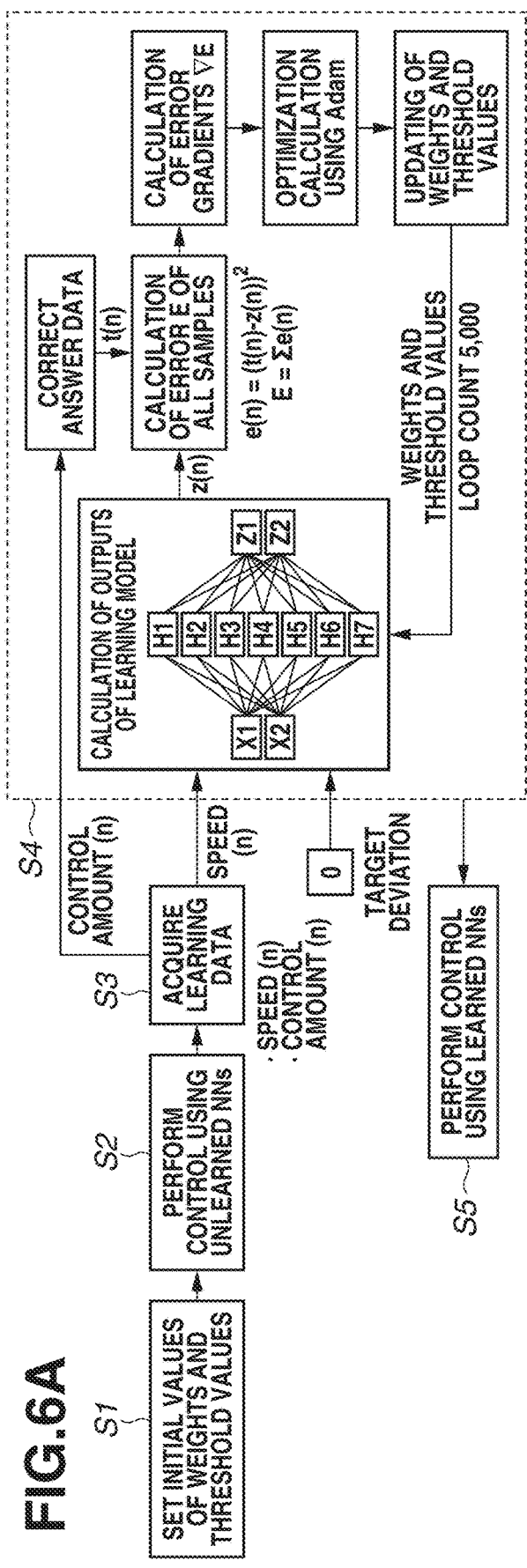
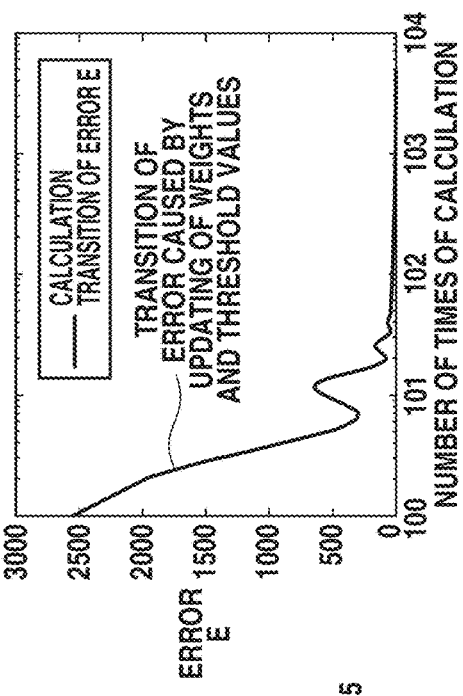
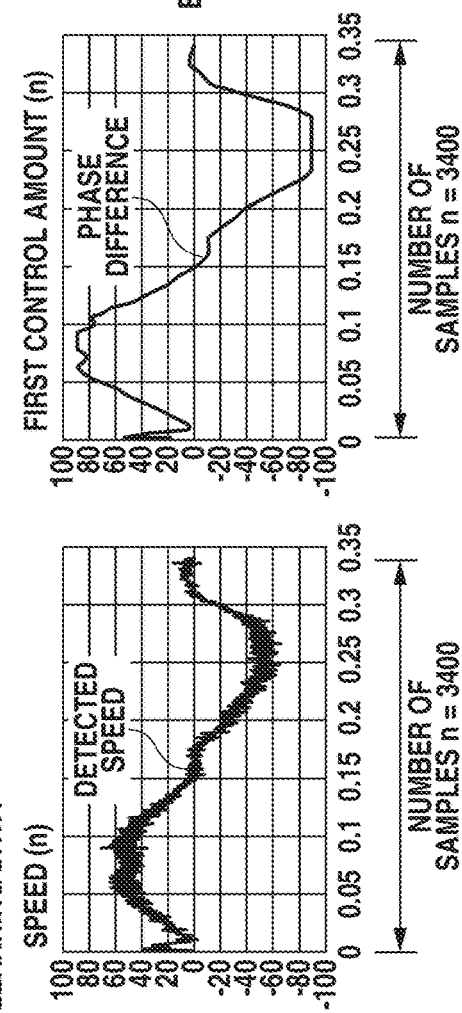

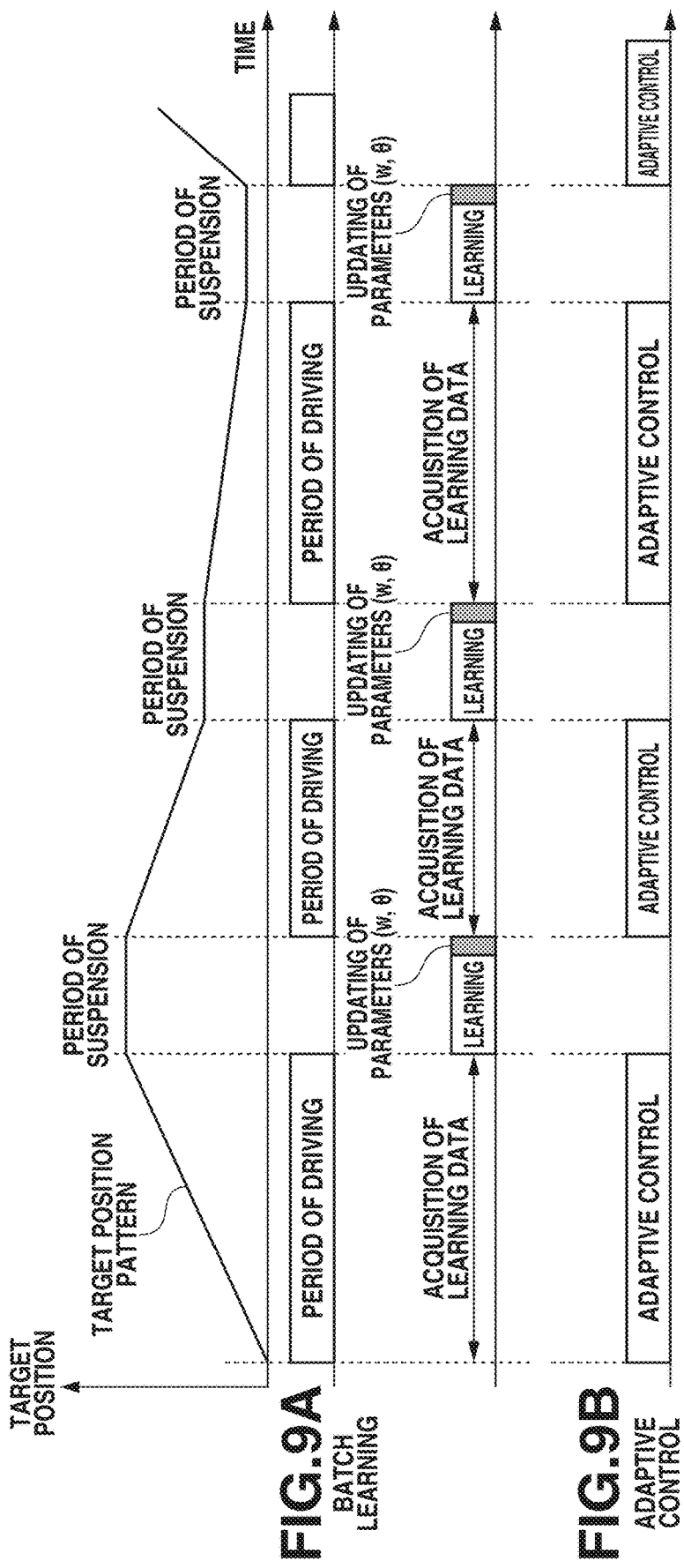

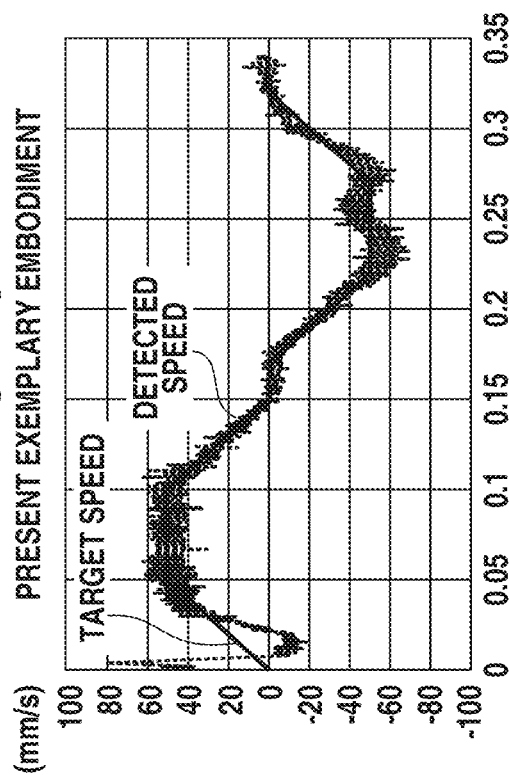
FIG.10A
WITHOUT ADAPTIVE CONTROL
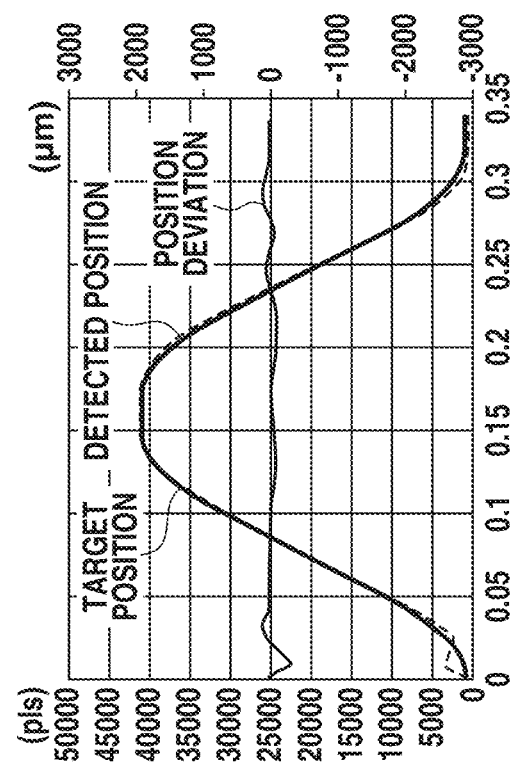
FIG.10B
PRESENT EXEMPLARY EMBODIMENT
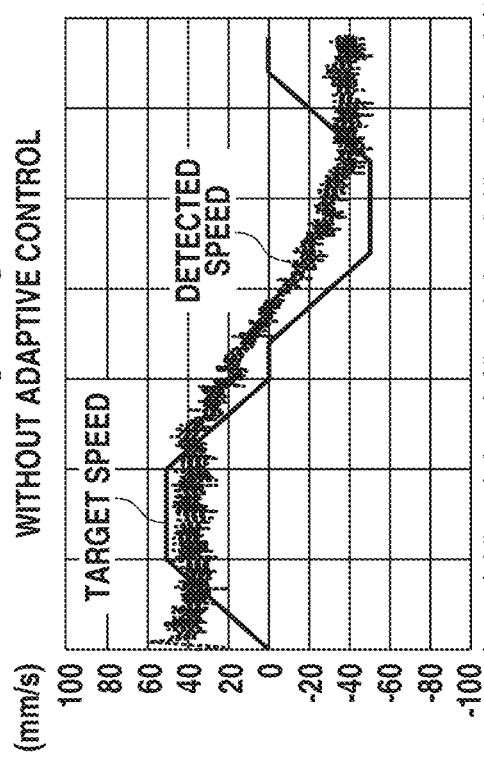
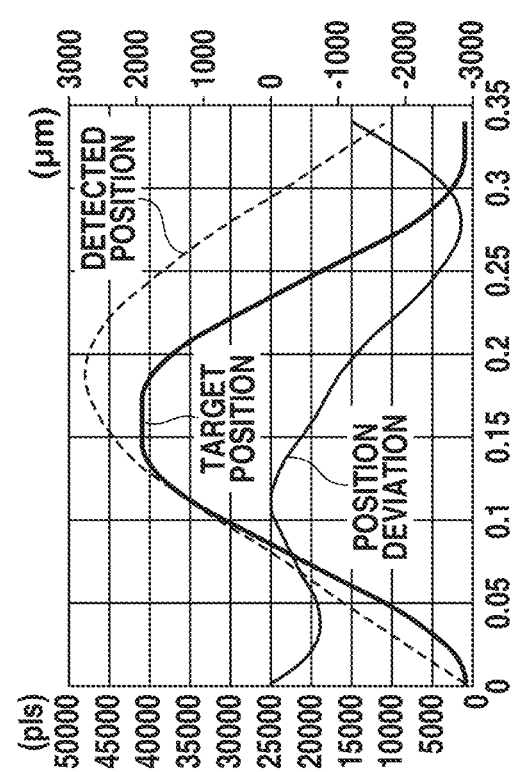

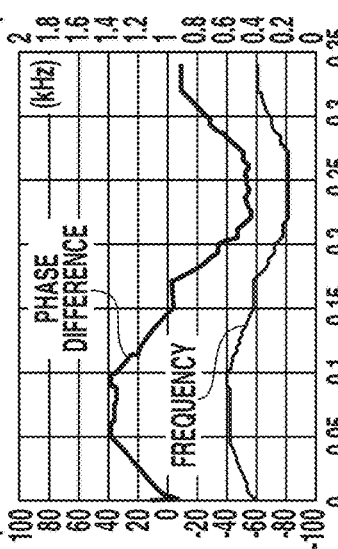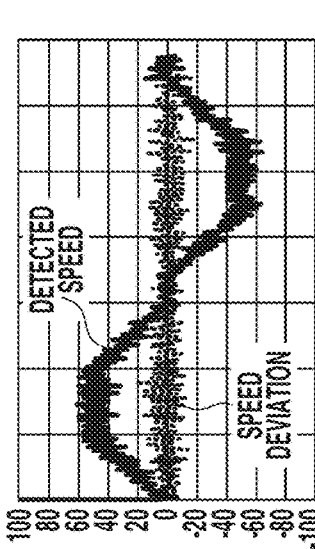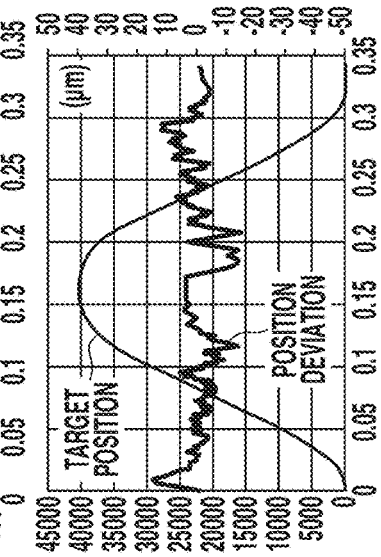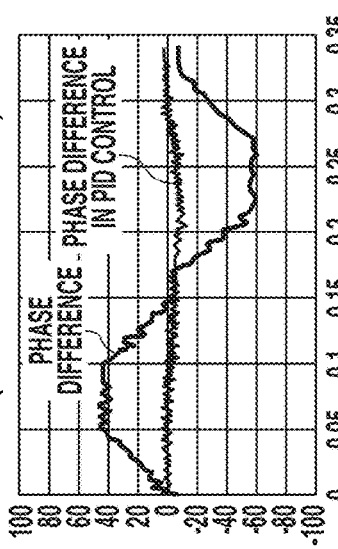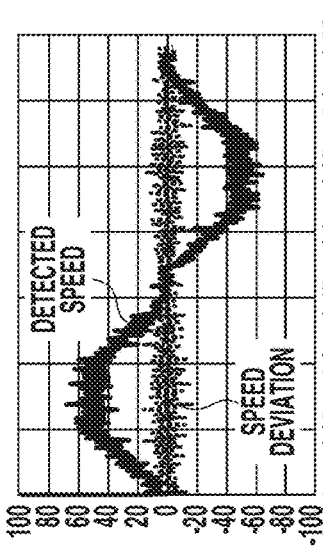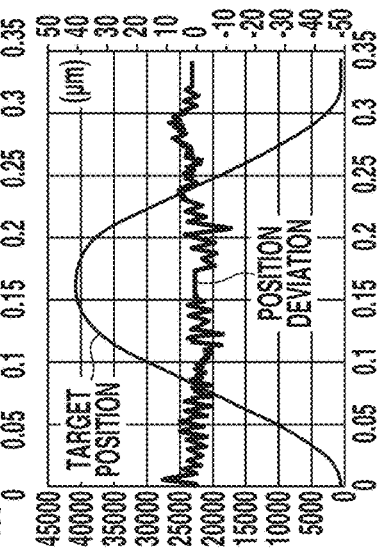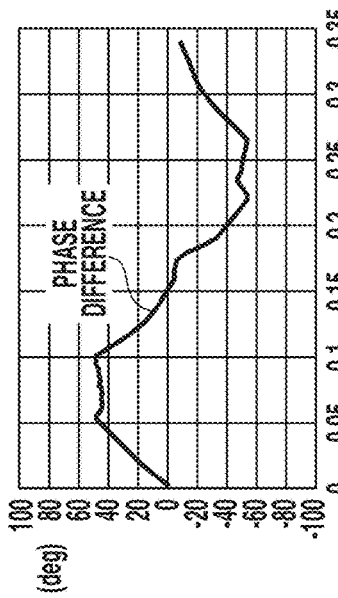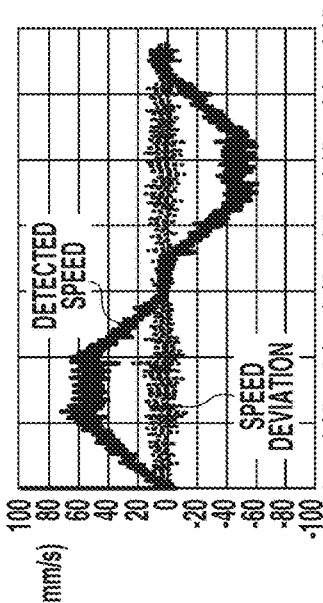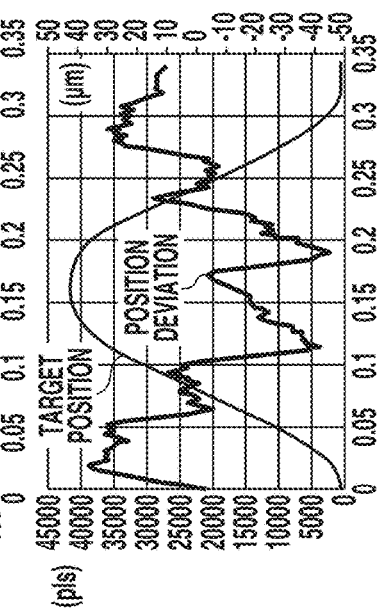

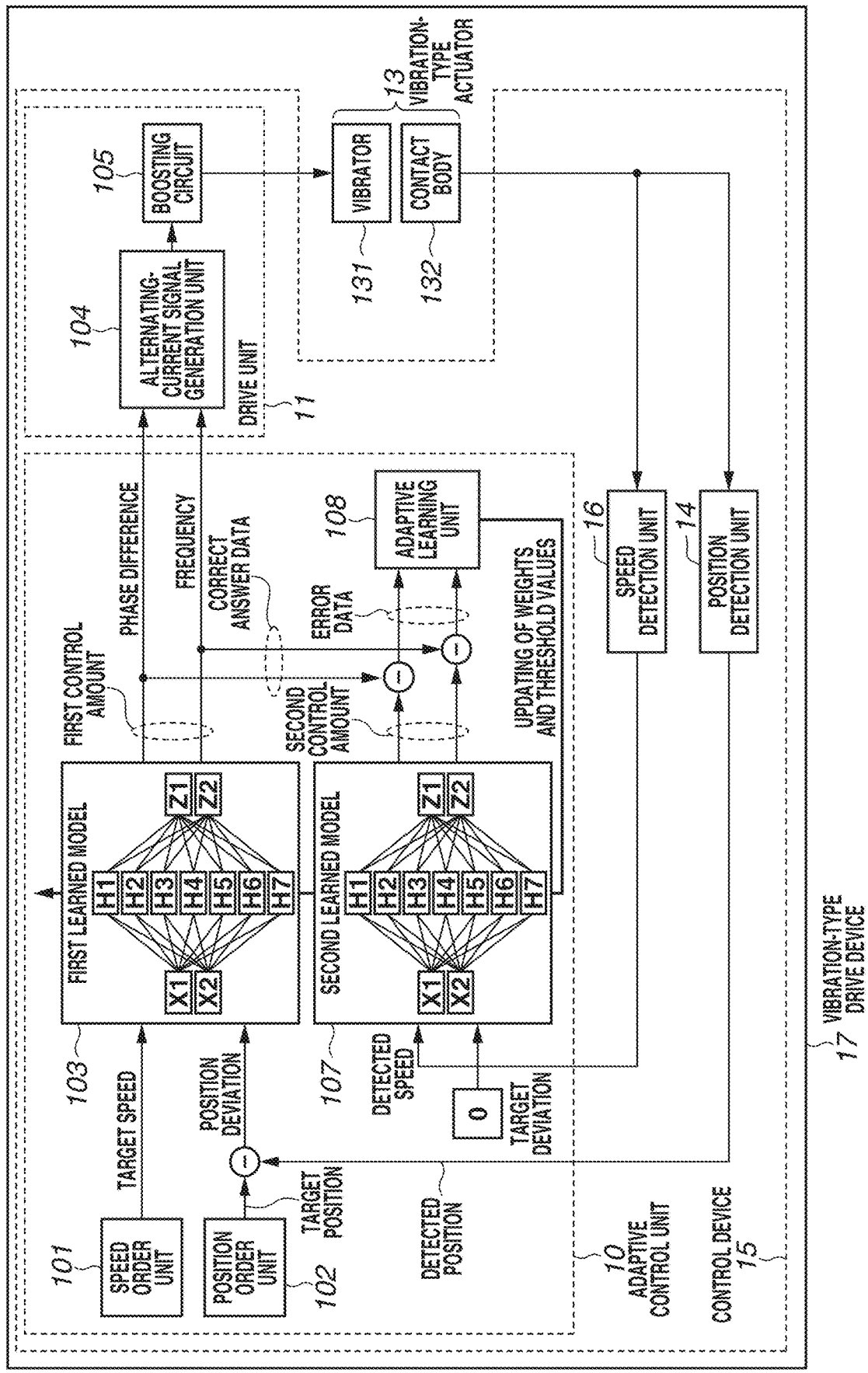

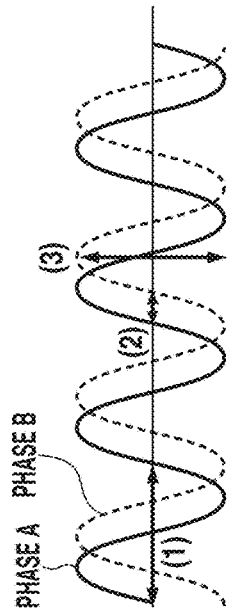
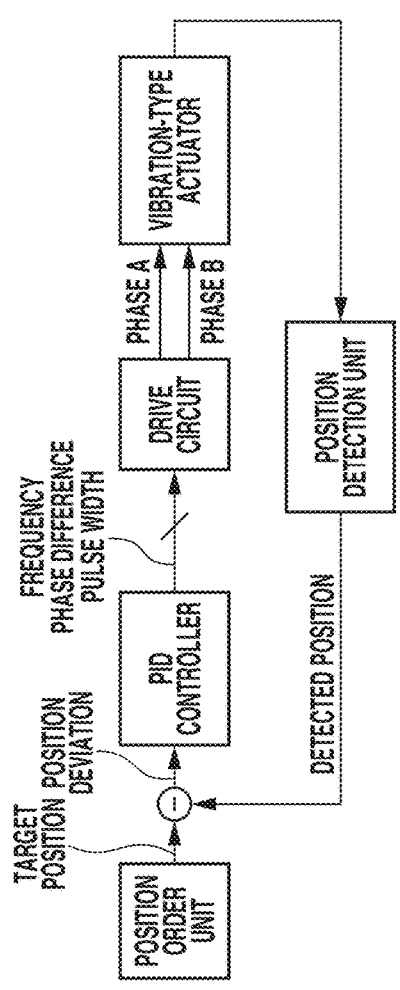
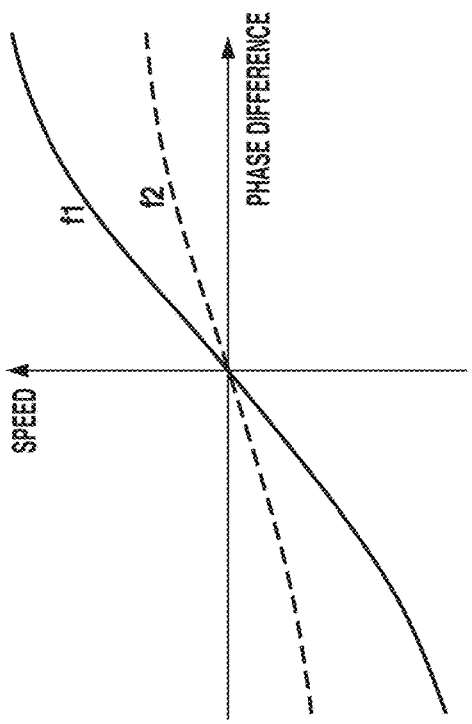
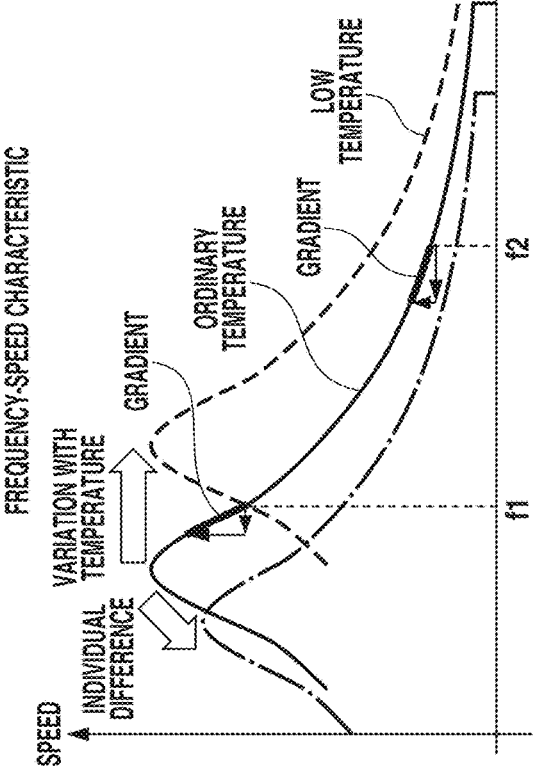

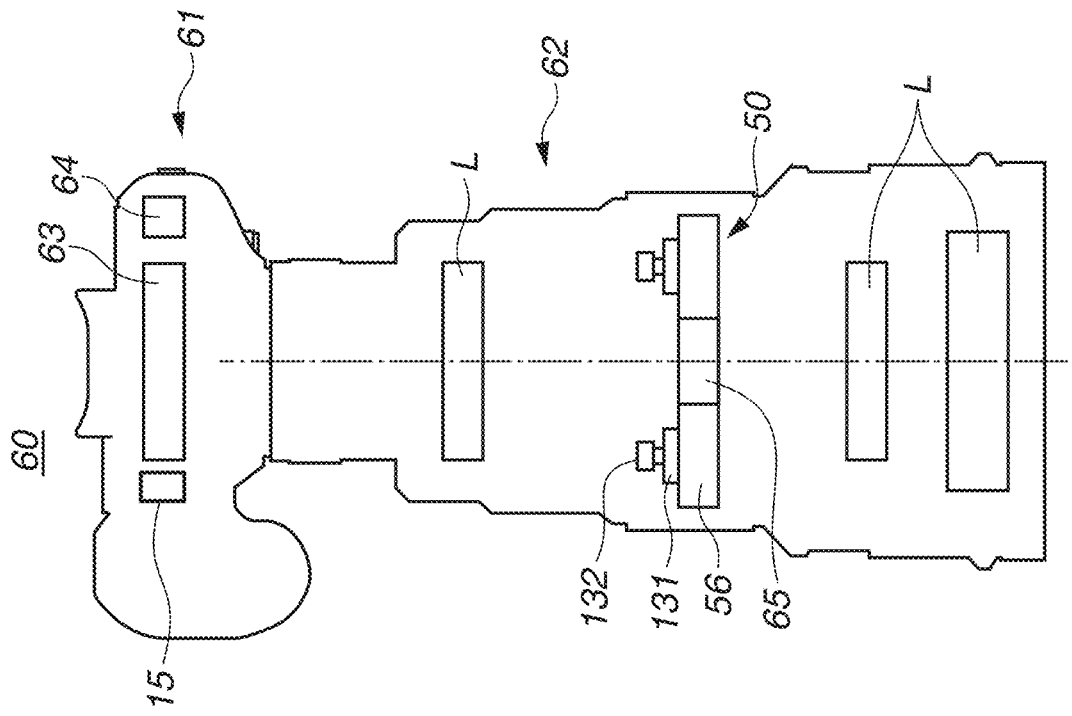
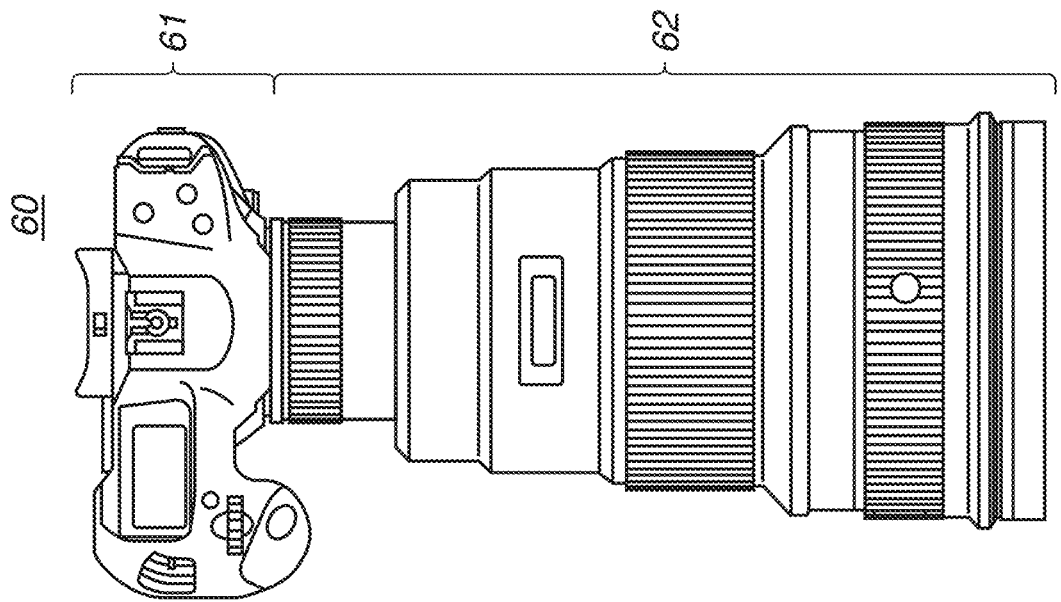

CONTROL DEVICE FOR VIBRATION-TYPE ACTUATOR, VIBRATION-TYPE DRIVE DEVICE INCLUDING VIBRATION-TYPE ACTUATOR AND CONTROL DEVICE, AND ELECTRONIC APPARATUS USING MACHINE LEARNING

BACKGROUND

Technical Field

Aspects of the embodiments generally relate to a control device for a vibration-type actuator, a vibration-type drive device including the vibration-type actuator and the control device, and an electronic apparatus.

Description of the Related Art

A vibration-type motor is described as an example of a vibration-type actuator. The vibration-type motor applies an alternating-current voltage to an electro-mechanical energy conversion element, such as a piezoelectric element, coupled to an elastic body, to cause the electro-mechanical energy conversion element to generate a high-frequency vibration. Thus, the vibration-type motor is a non-electromagnetic drive type motor configured to bring out such vibration energy as continuous mechanical motion.

The vibration-type motor has excellent motor performances such as reduction in size and weight, high precision, and high torque in low-speed driving, as compared with an electromagnetic drive type motor. On the other hand, the vibration-type motor has non-linear motor characteristics and is, therefore, difficult to model, and, since the controllability thereof varies according to drive conditions or temperature environments, it becomes necessary to devise an appropriate control system. Moreover, the vibration-type motor requires a large number of control parameters, such as frequency, phase difference, and voltage amplitude, so that the adjustment thereof also becomes complicated.

FIG. 15A is a control block diagram of a conventional vibration-type drive device using usual proportional-integral-derivative (PID) control (see Japanese Patent Application Laid-Open No. 2016-144262). Alternating-current voltages (alternating-current signals) of two phases (phase A and phase B) are output from a drive circuit to which a control amount to be described below has been input. Controlling the frequency (1/period), phase difference, and voltage amplitude (see FIG. 15B) of each of the alternating-current voltages of two phases to be output from the drive circuit enables controlling the detected speed of the vibration-type motor. Furthermore, the voltage amplitude is variable by a pulse width which is input from a PID controller to the drive circuit. Moreover, portions (1), (2), and (3) in FIG. 15B represent the period, phase difference, and voltage amplitude, respectively, of each of the alternating-current voltages of two phases to be output from the drive circuit.

A position deviation, which is a difference between a target position generated by a position order unit and a detected position of the vibration-type motor detected by a position detection unit (target position−detected position), is input to the PID controller (a control amount output unit). Then, a control amount (frequency, phase difference, and pulse width) obtained by PID calculation performed according the position deviation input to the PID controller, which is a control amount to be sequentially output at each control sampling period, is input from the PID controller to the drive circuit. Then, alternating-current voltages of two phases are output from the drive circuit to which the control amount has been input, so that the speed of a vibration-type actuator is controlled by the alternating-current voltages of two phases output from the drive circuit. Then, with these processes, position feedback control is performed. Furthermore, the control sampling period is hereinafter referred to simply as "sampling period".

FIG. 15C is a diagram schematically illustrating a frequency-speed characteristic of the vibration-type motor. Specifically, FIG. 15C illustrates a behavior in which the gradient of the frequency-speed characteristic is large at a frequency (f1) in a high-speed region (low-frequency range) and the gradient of the frequency-speed characteristic is small at a frequency (f2) in a low-speed region (high-frequency range). In the vibration-type motor, the gradient of a speed curve differs with a speed region to be used, so that it is difficult to adjust a PID control gain. For example, in the illustrated behavior, the frequency f1 in a high-speed region differs in gradient from the frequency f2 in a low-speed region. FIG. 15D is a diagram schematically illustrating a phase difference-speed characteristic of the vibration-type motor and is a diagram specifically illustrating a comparison in the phase difference-speed characteristic between the low-speed region (f2) and the high-speed region (f1).

As illustrated in FIGS. 15C and 15D, since the vibration-type actuator differs in the gradient of the frequency-speed characteristic and in the phase difference-speed characteristic depending on a speed region to be used, the controlled performance thereof may be changed by the phase difference. Moreover, in the case of a change in environmental temperature, for example, in the case of a change from ordinary temperature to low temperature, the resonance frequency shifts to the high-frequency side based on the temperature characteristic of a piezoelectric element. In that case, since the speed and the gradient differ from those obtained in a case where the piezoelectric element is driven with the same drive frequency, the controlled performance may also be changed by the environmental temperature. Moreover, since the speed and the gradient also differ with an individual difference of the vibration-type motor, the controlled performance may also be changed by individual vibration-type motors. Moreover, the controlled performance may also be changed by a variation with time. It is necessary to adjust PID control gains (a proportional gain, integral gain, and derivative gain for PID control) in consideration of all of the above-mentioned change factors and perform designing in such a way as to secure a gain margin and a phase margin.

Therefore, there has been a need for, for example, a control device for a vibration-type actuator including, as a main control amount output unit, a control amount output unit different from the conventional PID controller.

SUMMARY

Aspects of the embodiments are generally directed to providing, for example, a control device for a vibration-type actuator including, as a main control amount output unit, a control amount output unit different from the conventional PID controller.

According to an aspect of the embodiments, a control device for a vibration-type actuator, which causes a vibrator to generate a vibration and causes a contact body being in contact with the vibrator to relatively move with respect to the vibrator by the vibration, includes a control unit including a first control amount output unit and a second control amount output unit. The first control amount output unit includes a first learned model subjected to machine learning in such a way as to output a first control amount for causing the contact body to relatively move with respect to the vibrator in a case where a first speed for causing the contact body to relatively move with respect to the vibrator has been input. The second control amount output unit includes a second learned model subjected to machine learning in such a way as to output a second control amount, which is data of the same data format as that of the first control amount, in a case where a second speed detected when the contact body has been caused to relatively move with respect to the vibrator by the first control amount has been input. The control unit updates parameters of the first learned model and parameters of the second learned model based on a control deviation, which is a difference between the first control amount and the second control amount output within the same sampling period as that of the first control amount.

Further features of the disclosure will become apparent from the following description of exemplary embodiments with reference to the attached drawings.

BRIEF DESCRIPTION OF THE DRAWINGS

FIGS. 6A, 6B, and 6C are a flowchart and graphs for a case where Adam (short for Adaptive Moment Estimation) is used as an optimization method for parameters of a neural network.

FIGS. 9A and 9B are timing charts illustrating batch learning in a machine learning unit and adaptive control in the adaptive control unit (control unit), respectively.

FIGS. 10A and 10B are diagrams illustrating results obtained when feedback control is performed with a predetermined target position pattern using an unlearned model and advantageous effects obtained by adaptive control performed in the present exemplary embodiment.

FIGS. 11A, 11B, and 11C are diagrams illustrating a comparison between results obtained in cases where feedback control is performed with a predetermined target position pattern using PID control and adaptive control performed in the present exemplary embodiment, respectively.

FIG. 12 is a control block diagram of a vibration-type drive device in a first modification example of the first exemplary embodiment.

FIGS. 15A, 15B, 15C, and 15D are diagrams illustrating an example of a conventional control device for a vibration-type motor using usual PID control.

FIGS. 20A and 20B are respectively a plan view illustrating an outer appearance of and a schematic diagram of an internal configuration of an imaging apparatus, which is an example of application of a control device for a vibration-type actuator in a fifth exemplary embodiment.

DESCRIPTION OF THE EMBODIMENTS

Figure 1:
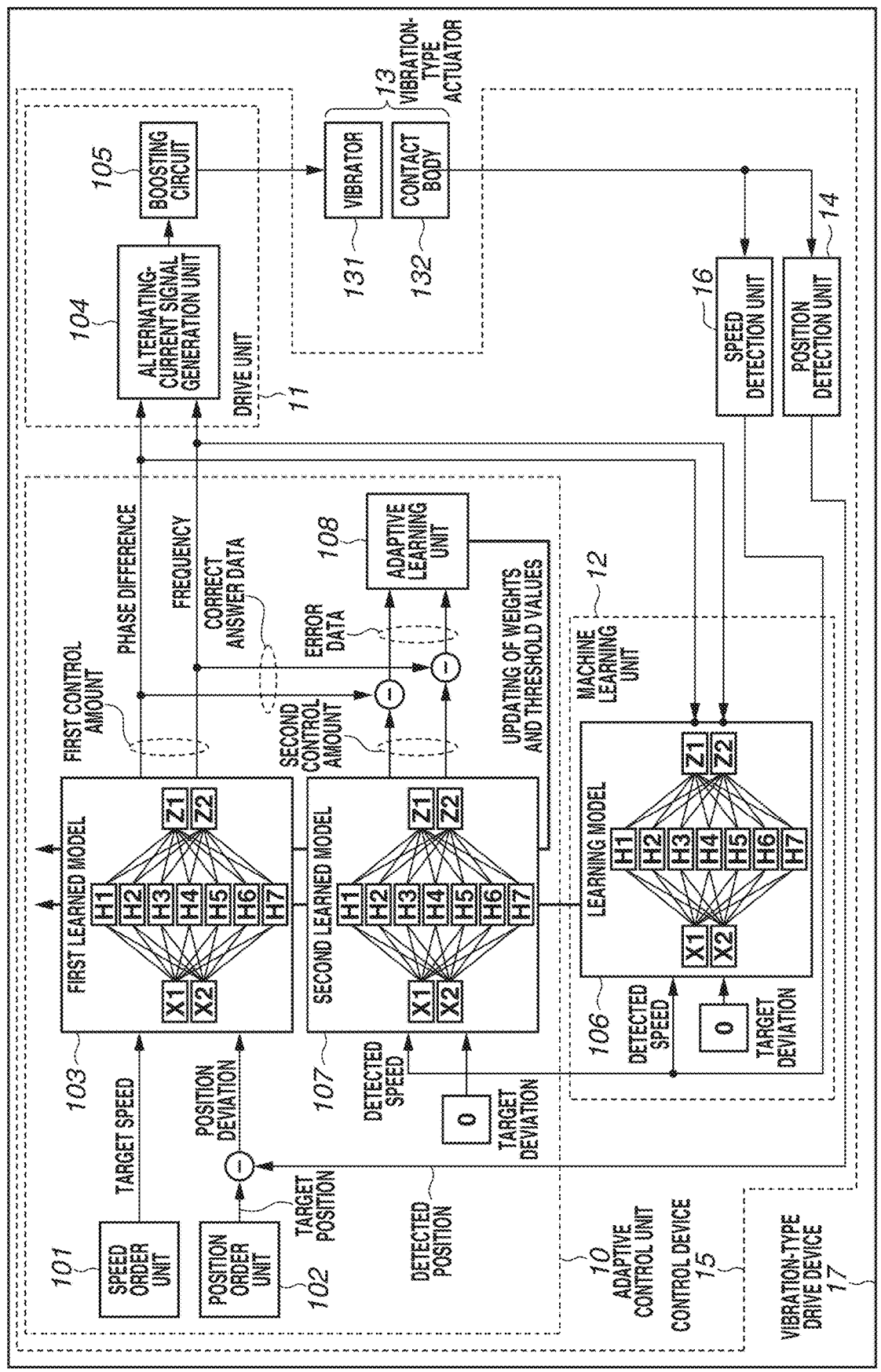
FIG. 1 is a control block diagram of a vibration-type drive device in a first exemplary embodiment.

FIG. 1 is a diagram illustrating a vibration-type drive device 17 in a first exemplary embodiment. The vibration-type drive device 17 includes a control device 15 and a vibration-type motor 13 (vibration-type actuator). The control device 15 includes an adaptive control unit 10 (control unit), which controls the vibration-type actuator, a machine learning unit 12, a drive unit 11, a position detection unit 14 (position detection unit), and a speed detection unit 16 (speed detection unit). In FIG. 1, a device or circuit obtained by excluding the vibration-type actuator 13 from the vibration-type drive device 17 is the control device 15.

The vibration-type actuator 13 includes a vibrator 131 and a contact body 132. The position detection unit 14 detects a position of the contact body 132 relative to the vibrator 131 (hereinafter referred to as a "relative position"). The relative position detected by the position detection unit 14 is hereinafter referred to as "detected position". The speed detection unit 16 detects a speed of the contact body 132 relative to the vibrator 131 (hereinafter referred to as a "relative speed"). The relative speed detected by the p speed detection unit 16 is hereinafter referred to as "detected speed".

The position detection unit 14 to be used includes, for example, what is called an absolute encoder and an increment encoder, but is not limited to these. The speed detection unit 16 is not limited to a unit which directly detects speed information (speed sensor), but can be a unit which indirectly detects speed information by calculating position information.

The adaptive control unit 10 is configured to be able to generate a signal for controlling driving of the vibrator 131 (relative movement of the contact body 132 with respect to the vibrator 131). Thus, the adaptive control unit 10 inputs a target speed (first speed) and a position deviation to a learned model and uses a phase difference and a frequency output from the learned model as a control amount (first control amount) of the vibration-type actuator 13.

The target speed (first speed) is a speed which is set in such a way as to be followed by a detected speed (second speed) in causing the contact body 132 to relatively move with respect to the vibrator 131. The position deviation is a difference between a target position (first position) and a detected position (second position). The target position (first position) is a position which is set in such a way as to be followed by the detected position (second position) in causing the contact body 132 to relatively move with respect to the vibrator 131. The target speed can be generated by differentiating the target position at every time. The target position can be generated by integrating the target speed.

Furthermore, the control amount (the first control amount or a second control amount described below) to be used can include, in addition to a phase difference and a frequency, a pulse width for changing a voltage amplitude. As described below, the first control amount is not limited to two parameters, i.e., a phase difference and a frequency, but can be one of a phase difference, a frequency, and a voltage amplitude or can be a combination of two of a phase difference, a frequency, and a voltage amplitude. Moreover, the first control amount can be all of a phase difference, a frequency, and a voltage amplitude. Moreover, the first control amount can be a combination of one or more of a phase difference, a frequency, and a voltage amplitude and a control amount other than the phase difference, frequency, and voltage amplitude.

The adaptive control unit 10 includes a speed order unit 101 (speed order unit), which generates a target speed and orders the target speed, and a position order unit 102 (position order unit), which generates a target position and orders the target position. Moreover, the adaptive control unit 10 includes a first learned model 103, a second learned model 107, and an adaptive learning unit 108.

The drive unit 11 includes an alternating-current signal generation unit 104 (alternating-current signal generation unit) and a boosting circuit 105. A target speed for each time is generated by the speed order unit 101. Moreover, a target position for each time is generated by the position order unit 102. Then, a difference between the target position and the detected position detected by the position detection unit 14 is calculated as a position deviation.

Here, with regard to each of the target speed and the target position, for example, one order value is generated by each generation unit at every sampling period. The sampling period refers to one cycle from acquisition of the position deviation in FIG. 1 until just before starting of acquisition of the position deviation via outputting of the control amount, application of an alternating-current voltage to the vibrator 131, and outputting of the detected speed and the detected position. The position or speed of the vibration-type actuator 13 is fed back at the above-mentioned cycle.

Figure 4A:
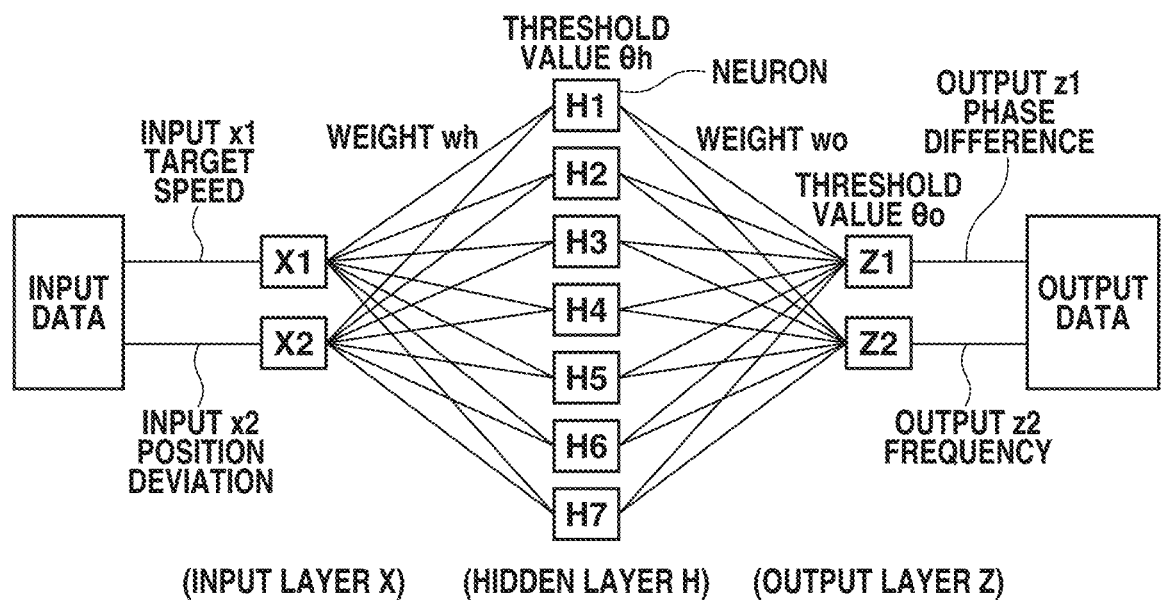
FIGS. 4A, 4B, and 4C are diagrams illustrating a neural network configuration included in each of a first learned model, a second learned model, and a learning model in the first exemplary embodiment.

With use of the target speed and the position deviation, the first control amount (phase difference and frequency) is calculated and output by the first learned model 103. Each of the first learned model 103, the second learned model 107, and the learning model 106 includes a neural network (hereinafter also referred to as "NN") configuration illustrated in FIG. 4A. The NN includes a layer X serving as an input layer, a layer H serving as a hidden layer, and a layer Z serving as an output layer. In the first exemplary embodiment, with regard to the input data, the first learned model 103 sets the target speed to an input x1 and sets the position deviation to an input x2, and, with regard to the output data, the first learned model 103 sets the phase difference to an output z1 and sets the frequency to an output z2.

Figure 4B:
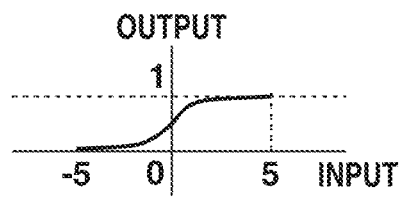
Figure 4C:
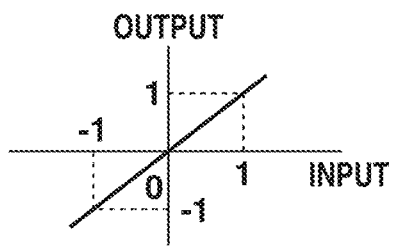

The input layer includes two neurons (X1, X2), the hidden layer includes seven neurons (H1, H2, ..., H7), the output layer includes two neurons (Z1, Z2), and a common sigmoid function (FIG. 4B) is used as an activating function. The number of neurons of the hidden layer is not limited to 7, but is favorably in the range of 3 to 20. This is because, as the number of neurons of the hidden layer is smaller, the learning accuracy decreases but learning finishes fast (the learning speed becomes higher) and, as the number of neurons of the hidden layer is larger, the learning accuracy increases but the learning speed becomes lower, so that the learning accuracy and the learning speed are in a trade-off relationship. Moreover, while, usually, a sigmoid function or ReLU (ramp function) is used as an activating function for the output layer, a linear function (FIG. 4C) is used for the purpose of dealing with the minus sign of a phase difference included in the control amount.

A weight (first weight) which connects a neuron (first neuron) of the input layer and a neuron (second neuron) of the hidden layer is set to "wh". Moreover, a threshold value of the neuron (second neuron) of the hidden layer is set to "θh". Moreover, a weight (second weight) which connects the neuron (second neuron) of the hidden layer and a neuron (third neuron) of the output layer is set to "wo". Moreover, a threshold value of the neuron (third neuron) of the output layer is set to "θo". As the weights and threshold values, values obtained by learning performed by the machine learning unit 12 described below are applied. The learned NN can be seen as an aggregation obtained by extracting shared feature patterns from time-series data about the relative speed and the control amount of the vibration-type actuator. Accordingly, the output is a value which is obtained by a function including weights and threshold values as variables (parameters). With regard to the input data, the second learned model 107 sets the detected speed detected by the speed detection unit 16 to an input x1 and sets the target deviation (zero) to an input x2, and, with regard to the output data, the second learned model 107 sets the phase difference to an output z1 and sets the frequency to an output z2. Furthermore, the target deviation can be given an offset value other than zero. A control amount "t" (first control amount) output from the first learned model 103 is set as correct answer data, and a difference between the control amount "t" and a control amount "z" (second control amount) output from the second learned model 107 is calculated. Then, such a difference, i.e., error data based on a control deviation (t−z) is input to the adaptive learning unit 108.

The adaptive learning unit 108 performs updating of parameters (weights and threshold values) of NNs at every sampling period using stochastic gradient descent (SGD), which is one of inverse error propagation methods, as described below. Furthermore, updating of parameters (weights and threshold values) is performed on both the first learned model 103 and the second learned model 107, and the same parameters are applied at the same timing.

After updating of parameters, a control amount that is based on the parameters updated at a next sampling period is output, so that the vibration-type actuator 13 is controlled. Furthermore, the frequency of updating does not necessarily need to be every sampling period, but can be a predetermined period such as two times or three times of the sampling period.

The first control amount (phase difference and frequency) output from the first learned model 103, which is an NN, is input to the alternating-current signal generation unit 104, so that the speed and driving direction of the vibration-type actuator 13 are controlled. The alternating-current signal generation unit 104 generates alternating-current signals of two phases based on the first control amount.

The boosting circuit 105 includes, for example, a coil and a transformer, and an alternating-current voltage boosted to a predetermined driving voltage by the boosting circuit 105 is applied to a piezoelectric element of the vibrator 131, thus driving the contact body 132. An example of the vibration-type actuator to which the present exemplary embodiment is applicable is described with reference to the drawings. The vibration-type actuator in the first exemplary embodiment includes a vibrator and a contact body.

FIGS. 2A, 2B, 2C, and 2D are diagrams used to explain the drive principle of a vibration-type actuator of the linear drive type (direct acting type) as an example of a vibration-type actuator. The vibration-type actuator 13 illustrated in FIG. 2A includes an elastic body 203, a vibrator 131, which includes a piezoelectric element 204 serving as an electromechanical energy conversion element bonded to the elastic body 203, and a contact body 132, which is driven by the vibrator 131. Applying an alternating-current voltage to the piezoelectric element 204 causes two vibration modes such as those illustrated in FIGS. 2C and 2D to be generated, thus moving the contact body 132, which is in pressure contact with projection portions 202, in arrow directions.

Figure 2A:
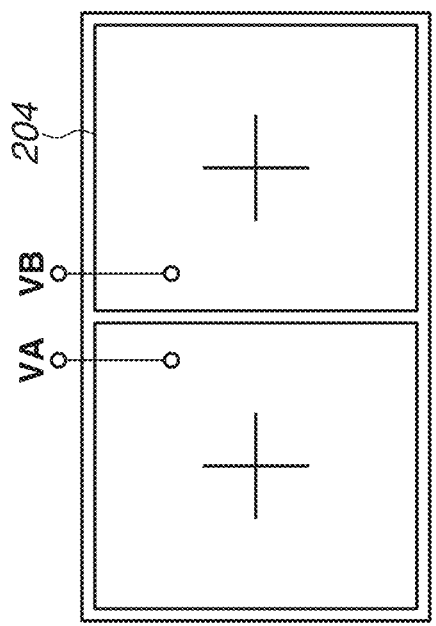
FIGS. 2A, 2B, 2C, and 2D are diagrams used to explain the drive principle of a vibration-type actuator of the linear drive type.
Figure 2B:
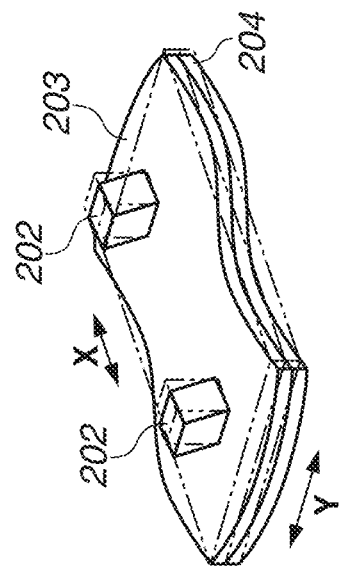
Figure 2C:
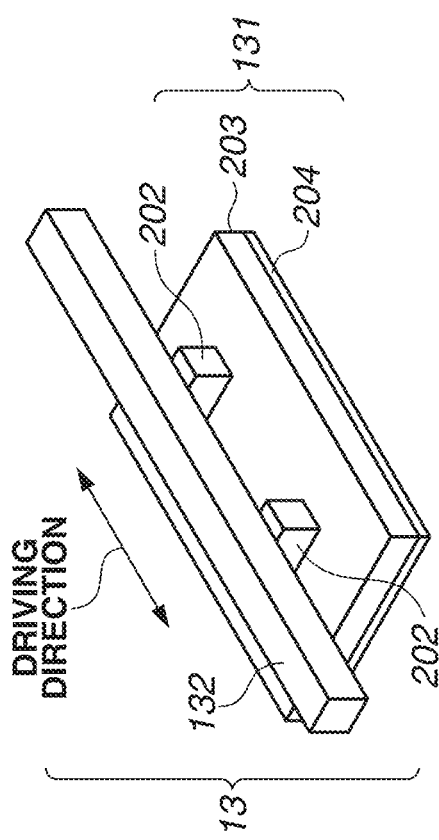

FIG. 2B is a diagram illustrating an electrode pattern of the piezoelectric element 204, and, for example, in the piezoelectric element 204 of the vibrator 131, electrode regions obtained by division in two halves in the longitudinal direction are formed. Moreover, the directions of polarization of the respective electrode regions are set to the same direction (+). Out of the two electrode regions of the piezoelectric element 204, an electrode region located on the right side in FIG. 2B receives an applied alternating-current voltage (VB) and an electrode region located on the left side in FIG. 2B receives an applied alternating-current voltage (VA).

When the alternating-current voltages VB and VA are set as alternating-current voltages with frequencies near the resonant frequency in the first vibration mode and with the same phase, the entirety (two electrode regions) of the piezoelectric element 204 expands at a certain moment and contracts at another moment. As a result, in the vibrator 131, a vibration in the first vibration mode illustrated in FIG. 2C (hereinafter referred to as a "thrust-up vibration") occurs. This causes a displacement in the thrust-up direction (Z-direction) in the projection portions 202.

Moreover, when the alternating-current voltages VB and VA are set as alternating-current voltages with frequencies near the resonant frequency in the second vibration mode and with phases thereof shifting from each other by 180°, at a certain moment, the right-side electrode region of the piezoelectric element 204 contacts and the left-side electrode region thereof expands. Moreover, at a different moment, the inverse relationship occurs. As a result, in the vibrator 131, a vibration in the second vibration mode illustrated in FIG. 2D (hereinafter referred to as a "feed vibration") occurs. This causes a displacement in the driving direction (feed direction or X-direction) in the projection portions 202.

Accordingly, applying alternating-current voltages with frequencies near the resonant frequency in the first and second vibration modes to the electrodes of the piezoelectric element 204 enables producing a vibration obtained by combining the first and second vibration modes.

Figure 2D:
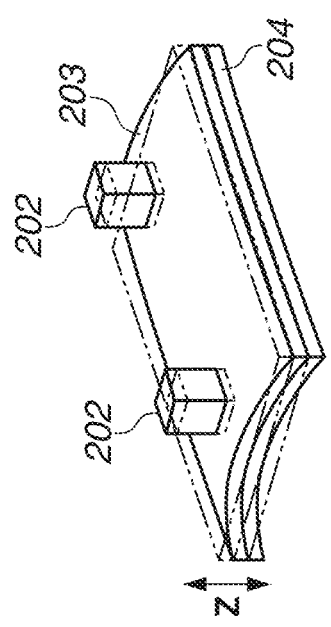

In this way, combining the first and second vibration modes causes the projection portions 202 to perform elliptic motion in a cross-section perpendicular to the Y-direction (a direction perpendicular to the X-direction and the Z-direction) as viewed in FIG. 2D. The elliptic motion causes the contact body 132 to be driven in arrow directions illustrated in FIG. 2A. Such directions in which the contact body 132 and the vibrator 131 move relative to each other, i.e., directions in which the contact body 132 is driven by the vibrator 131 (here, the X-direction) are referred to as the "driving direction". Moreover, the amplitude ratio R (the amplitude of the feed vibration/the amplitude in the thrust-up vibration) of the first vibration mode to the second vibration mode is able to be changed by changing a phase difference between alternating-current voltages of two phases to be input to the electrodes obtained by division in two halves. In this vibration-type actuator, changing the amplitude ratio of vibrations enables changing the speed of the contact body.

Furthermore, while, in the above description, a case where the vibrator 131 remains still (is fixed) and the contact body 132 moves (is driven) has been described as an example, the present exemplary embodiment is not limited to this example. The contact body and the vibrator only need to be configured such that the positions of the respective contact portions relatively change. For example, the contact body can remain still (be fixed) and the vibrator can move (be driven). Thus, in the present exemplary embodiment, the term "drive" means changing the relative position of the contact body with respect to the vibrator, and does not necessarily require that the absolute position of the contact body (for example, the position of the contact body that is based on the position of a housing containing the contact body and the vibrator) changes.

Furthermore, in the above description, the vibration-type actuator of the linear drive type (direct acting type) has been described as an example. Thus, a case where the vibrator 131 or the contact body 132 moves (is driven) in a straight-line direction has been described as an example, but the present exemplary embodiment is not limited to this example. The contact body and the vibrator only need to be configured such that the positions of the respective contact portions relatively change. For example, the vibrator and the contact body can move in rotational directions. The vibration-type actuator in which the vibrator and the contact body move in rotational directions includes, for example, a vibration-type actuator of the ring type (revolution type) including a ring-shaped vibrator.

The vibration-type actuator is used for, for example, autofocus driving for a camera.

Figure 3:
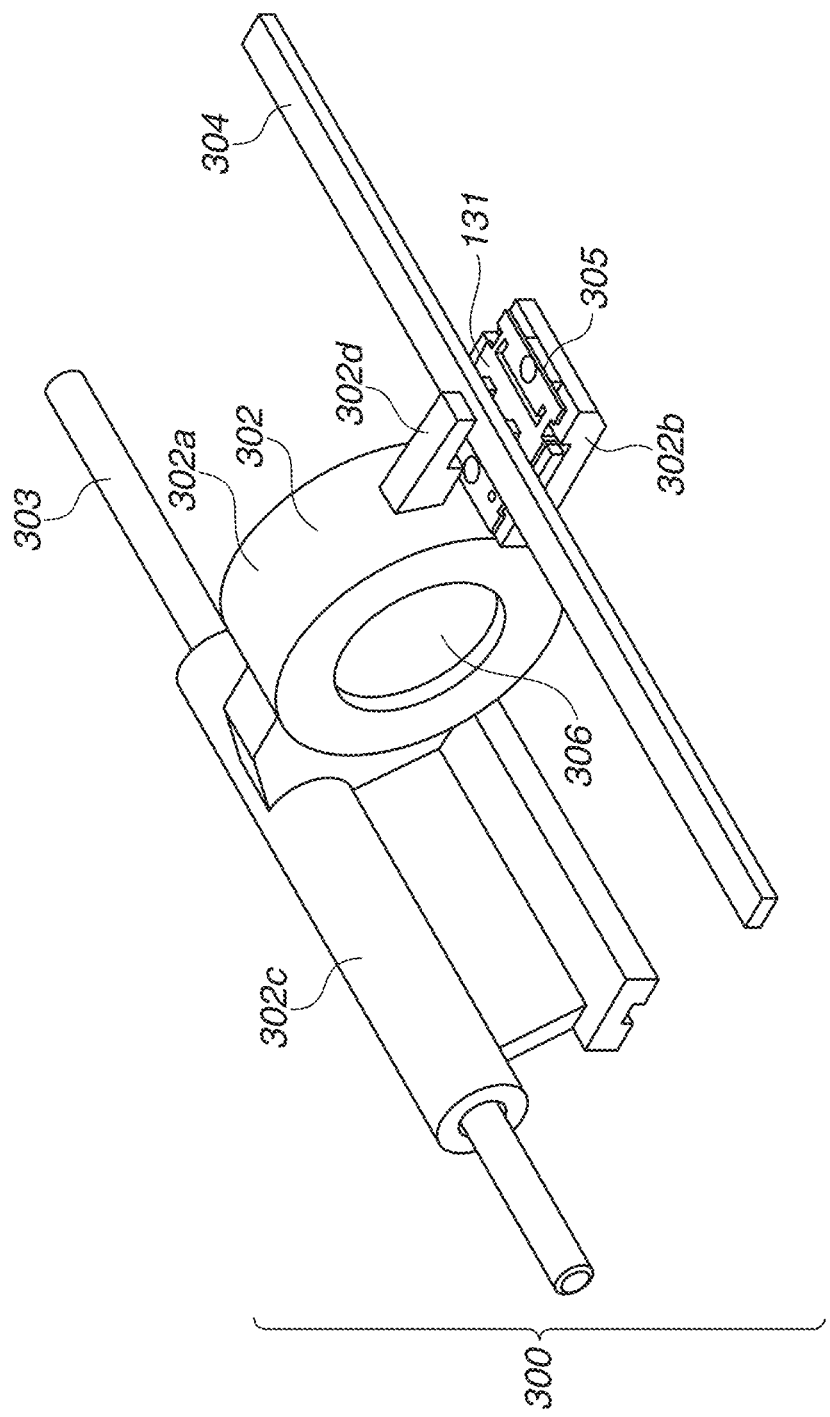
FIG. 3 is a perspective view used to explain a drive mechanism for a lens included in a lens barrel.

FIG. 3 is a perspective view used to explain a drive mechanism for a lens included in a lens barrel. The drive mechanism for a lens holder using the vibration-type actuator includes a vibrator, the lens holder, and a first guide bar and a second guide bar arranged in parallel with each other to hold the lens holder in a slidable manner. In the first exemplary embodiment, a case where the second guide bar is a contact body, the second guide bar is fixed, and the vibrator and the lens holder move integrally with each other is described.

The vibrator causes relative movement force to be generated between the vibrator and the second guide bar, which is in contact with projection portions of an elastic body, by elliptic motion of projection portions of the vibrator generated by application of driving voltages to an electro-mechanical energy conversion element. With this configuration, the lens holder, which is integrally fixed to the vibrator, is able to move along the first and second guide bars.

Specifically, a drive mechanism 300 for a contact body mainly includes a lens holder 302 serving as a lens holding member, a lens 306, a vibrator 131 to which a flexible printed circuit board is coupled, a pressure magnet 305, two guide bars 303 and 304, and a base body (not illustrated). Here, the vibrator 131 is described as an example of the vibrator.

Both ends of each of the first guide bar 303 and the second guide bar 304 are held and fixed by the base body (not illustrated) in such a manner that the first guide bar 303 and the second guide bar 304 are arranged in parallel with each other. The lens holder 302 includes a cylindrical holder portion 302a, a holding portion 302b, which holds and fixes the vibrator 131 and the pressure magnet 305, and a first guide portion 302c, which is fitted on the first guide bar 303 to act as a guide.

The pressure magnet 305, which constitutes a pressure unit, includes a permanent magnet and two yokes arranged at both ends of the permanent magnet. A magnetic circuit is formed between the pressure magnet 305 and the second guide bar 304, so that magnetic attractive force is generated between these members. The pressure magnet 305 is arranged at an interval from the second guide bar 304, and the second guide bar 304 is arranged in contact with the vibrator 131.

The above-mentioned magnetic attractive force acts to apply pressure force to between the second guide bar 304 and the vibrator 131. A second guide portion is formed by two projection portions of the elastic body being in pressure contact with the second guide bar 304. The second guide portion forms a guide mechanism with use of magnetic attractive force, and, while a state in which the vibrator 131 and the second guide bar 304 are drawn from each other due to, for example, being subjected to external force may occur, this state is coped with as follows.

Specifically, the lens holder 302 is configured to be returned to a desired position by a dropout prevention portion 302d included in the lens holder 302 colliding with the second guide bar 304. Applying desired alternating-current voltage signals to the vibrator 131 causes drive force to be generated between the vibrator 131 and the second guide bar 304, so that the lens holder 302 is driven by the generated drive force.

The relative position and relative speed of the vibrator 131 or the second guide bar 304 with respect to the second guide bar 304 or the vibrator 131 are detected by a position sensor (not illustrated in FIG. 3) attached to the second guide bar 304 or the vibrator 131. Then, a detected position and a detected speed are output from the position sensor. The detected position is fed back as a position deviation to the adaptive control unit 10, so that the vibration-type actuator is feedback controlled in such a way as to follow a target position at every unit time. The detected speed is input to the machine learning unit 12 and is then used as learning data together with a control amount (phase difference and frequency) output from the adaptive control unit 10. The learning data is data composed of a pair including input data and output data (correct answer data).

Furthermore, while, in the first exemplary embodiment, a control device of the two-phase driving type, in which a piezoelectric element serving as an electro-mechanical energy conversion element is driven with two separated phases, is described as an example, the present exemplary embodiment is not limited to the two-phase driving type but can also be applied to a vibration-type actuator of the two or more-phase driving type.

Next, the machine learning unit 12 is described in detail. The learning model 106 includes a neural network configuration (NN configuration) (see FIG. 4A), which receives, as inputs, a detected speed output from the speed detection unit 16 and a target deviation and outputs a phase difference and a frequency. The target deviation is a value which is set to be followed by the position deviation in causing the contact body 132 to relatively move with respect to the vibrator 131. Here, the target deviation is a value of the same dimension (data format) as that of the position deviation. The target deviation is set to, for example, zero, but can be given an offset value to compensate for any play in a mechanical system.

Instead of a target deviation, the learning model 106 may also receive, as an input, a speed deviation that is a difference between a target speed and a detected speed. The present inventors have found that learning of motor characteristics which are not able to be obtained by conventional techniques can be secondarily performed by inputting a speed deviation. More specifically, since learning of characteristics corresponding to frequency responses (i.e., transmission characteristics) of the vibration-type actuator has been performed based on a relationship between various vibrational components included in a speed deviation and a control amount, a weight value and a threshold value of an NN relating to a position deviation serving as an input are learned at proper values, whereby compensation for the control system can be performed.

A control amount (phase difference and frequency) output from the adaptive control unit 10 is used as correct answer data to be compared with a control amount output from an unlearned or learning-in-process learning model 106, so that an error is calculated. Furthermore, while, in the present example, a phase difference and a frequency are set as a control amount, besides, a combination of a pulse width and a frequency or a combination of a pulse width and a phase difference can be set as a control amount. Moreover, the number of neurons of an output layer of the NN can be set to one or three or more, and designing can be performed such that an optional combination can be selected out of a phase difference, a frequency, and a pulse width.

Figure 5:
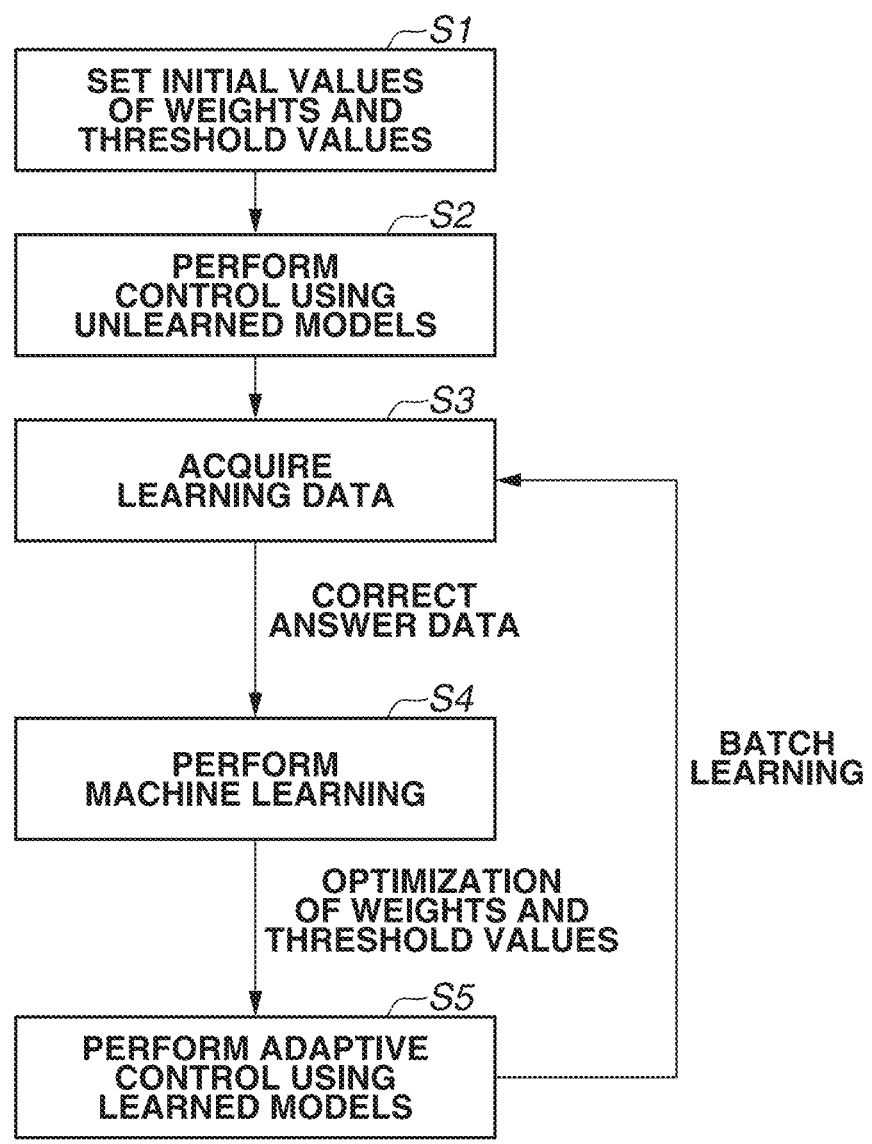
FIG. 5 is a flowchart of machine learning and adaptive control using the learned models in the first exemplary embodiment.

FIG. 5 is a flowchart of machine learning and adaptive control using the learned models. In step S1, the adaptive control unit 10 sets initial values of weights and threshold values of the first learned model 103 and the second learned model 107 based on a random function (an unlearned state). In step S2, the adaptive control unit 10 causes the above-mentioned two unlearned models (unlearned NNs) to perform control of the vibration-type actuator.

In step S3, the machine learning unit 12 acquires, as learning data, time-series data including the first control amount (phase difference and frequency) output from the first learned model 103 and the relative speed (detected speed) detected by the speed detection unit 16. In step S4, the machine learning unit 12 performs optimization calculation by machine learning using the learning model 106 with the control amount of the learning data set as correct answer data. The optimization refers to adjusting parameters of an NN in such a manner that an output from the NN resulting from an input to the NN comes close to the learning data, and is not limited to adjusting parameters of an NN in such a manner that an output from the NN resulting from an input to the NN becomes coincident with the learning data. Furthermore, the learning model 106 has the same NN configuration as that of each of the first learned model 103 and the second learned model 107 for use in adaptive control. The machine learning unit 12 optimizes the weights and threshold values of the NN and thus updates parameters of the first learned model 103 and the second learned model 107 of the adaptive control unit 10. In step S5, the adaptive control unit 10 performs adaptive control of the vibration-type actuator using the first learned model 103 and the second learned model 107 the weights and threshold values of which have been updated.

After performing adaptive control, to deal with a change in the drive condition or temperature environment, the adaptive control unit 10 returns the processing to step S3, in which the machine learning unit 12 performs acquisition of learning data. As an acquisition method for the learning data, batch learning, in which learning is performed during suspension of driving, is effected.

FIGS. 9A and 9B are timing charts used to explain batch learning, which is performed by the machine learning unit 12, and adaptive control, which is performed by the adaptive control unit 10. The horizontal axis indicates time, and the vertical axis indicates a target position pattern which is given as an order value to feedback control the vibration-type actuator.

FIG. 9A illustrates an example of batch learning, in which the machine learning unit 12 performs learning during suspension of driving of the vibration-type actuator (in a case other than the case where the contact body is caused to relatively move with respect to the vibrator). The batch learning in the present example includes acquiring, as learning data, time-series data about the relative speed (detected speed) detected in a period of driving of the vibration-type actuator and the control amount and performing machine learning and updating of parameters (weights and threshold values) of NNs with use of a period of suspension. Furthermore, machine learning does not necessarily need to be performed in every period of suspension, and, for example, a method of performing learning only in a case where a change in temperature environment or drive condition has been detected is also available.

FIG. 9B illustrates an example of adaptive control, in which the adaptive control unit 10 performs control while updating parameters of NNs of the first learned model 103 and the second learned model 107 with the sampling period during driving of the vibration-type actuator (in a case where the contact body is caused to relatively move with respect to the vibrator). In the present exemplary embodiment, unlike ordinary batch learning, since two learned models are concurrently used, even in a case where actual machine characteristics do not accord with the models due to, for example, a temperature environment or a load change, the models themselves are able to automatically adapt to changes with the sampling period.

The above-mentioned machine learning in step S4 is further described with reference to FIGS. 6A, 6B, and 6C.

FIGS. 6A to 6C are a flowchart and graphs for a case where Adam (short for Adaptive Moment Estimation) is used as an optimization calculation method (optimization algorithm) for NN parameters. Steps S1 to S2 are as described above with reference to FIG. 5 except that the control amount output from the NN is only a phase difference.

In step S3, the machine learning unit 12 acquires a first control amount (n) and a speed (n), which are time-series learning data illustrated in FIG. 6B. The first control amount (n) and the speed (n) are measurement data obtained in a case where the vibration-type actuator 13 has been controlled by the unlearned model, and a speed detected by the speed detection unit 16 when the vibration-type actuator 13 has been driven with the first control amount (n) is the speed (n). The number of samples "n" of each of the first control amount (phase difference) and the speed is 3,400. This is actual measurement data obtained in a case where the vibration-type actuator 13 has been driven at a control sampling rate (hereinafter referred to simply as a "sampling rate") (1/sampling period) of 10 kilohertz (kHz) for 0.34 seconds (sec). Furthermore, the learning data does not necessarily need to be acquired at the sampling rate, and thinning out the sampling rate enables saving of memory and shortening of a learning time.

In the present exemplary embodiment, the machine learning unit 12 sets the speed (n) as an input to the learning model 106, and compares an output z(n), which is a result of the learning model 106 performing calculation (derivation) and outputting, with data t(n), which is the first control amount (n) corresponding to correct answer data about the learning data. Then, the machine learning unit 12 calculates error e(n) as a result of the comparison. Specifically, the machine learning unit 12 calculates the error e(n) such that error e(n)=(t(n)−z(n))$^2$. In step S4, the machine learning unit 12 calculates error E of 3,400 samples (=Σe(n)=Σ(t(n)−z(n))$^2$) in a loop for the first time, and calculates respective error gradients ∇E of weights (wh, wo) and threshold values (θh, θo).

Next, the machine learning unit 12 performs optimization of parameters as follows using Adam, which is one of optimization calculation methods (optimization algorithms), with use of the error gradients ∇E.

$$v_t = \beta_1 \cdot v_{t-1} + (1 - \beta_1) \cdot \nabla E \qquad (1)$$

$$S_t = \beta_2 \cdot S_{t-1} + (1 - \beta_2) \cdot \nabla E^2 \qquad (2)$$

$$W_t = W_{t-1} - \eta \cdot \frac{v_t}{\sqrt{S_t + \epsilon}} \qquad (3)$$

In the above equations, $W_t$ denotes a parameter updating amount, ∇E denotes an error gradient, $V_t$ denotes a moving average of error gradients, $S_t$ denotes a moving average of square error gradients, η denotes a learning rate, and ε denotes a divide-by-zero prevention constant.

The respective parameters are set as η=0.001, $\beta_1$=0.9, $\beta_2$=0.999, and ε=10e−12. Each time the optimization calculation is repeated, the weights and threshold values are updated and the output z(n) of the learning model comes closer to the control amount (n) of the correct answer data, so that the error E becomes smaller.

FIG. 6C is a diagram illustrating the transition of the error E that is based on the number of times of calculation loops. Furthermore, a method other than the above-mentioned method can be used as the optimization method.

Figure 7B:
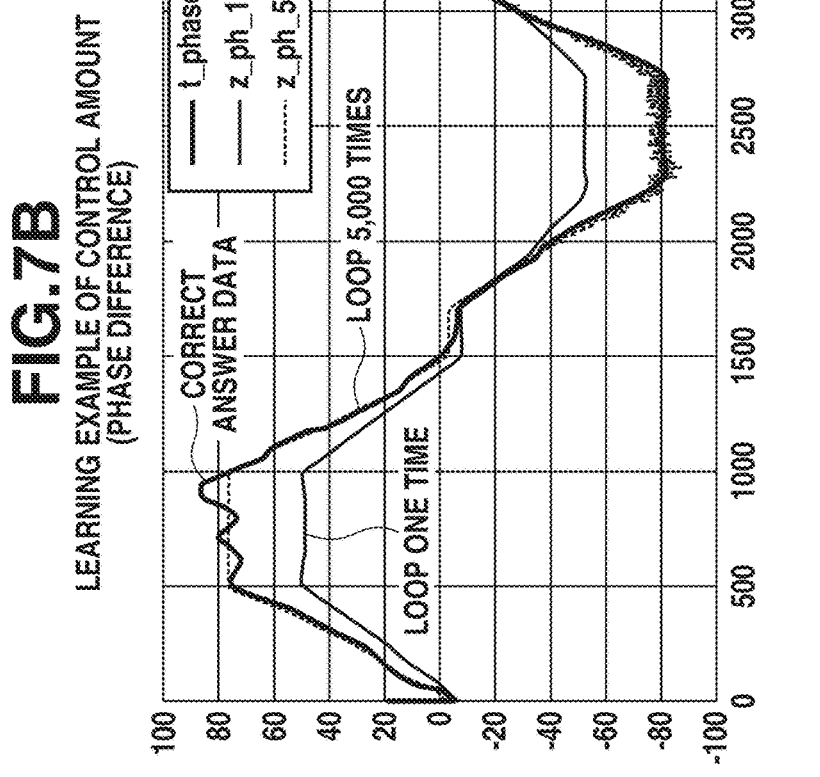
FIG. 7B is a diagram illustrating a learning example of a control amount (phase difference) using Adam.
Figure 7A:
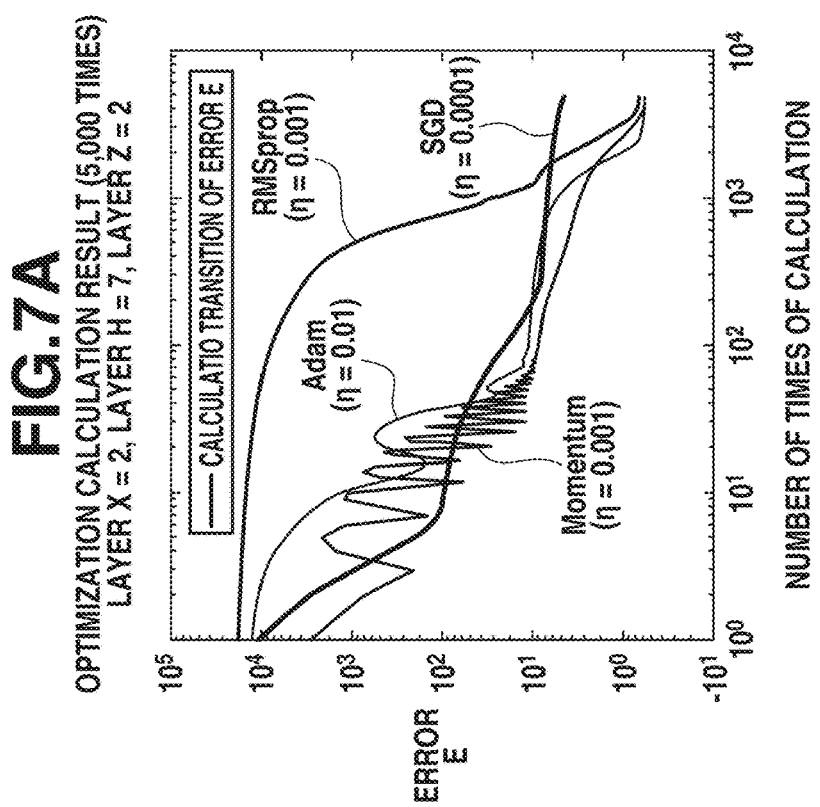
FIG. 7A is a diagram illustrating a comparison between calculation results of Adam, RMSprop (for Root Mean Square Propagation), Momentum, and stochastic gradient descent (SGD) using the learning model in the first exemplary embodiment and learning data obtained by performing actual measurement.

FIG. 7A is a diagram illustrating a comparison between calculation results of Adam, RMSprop (for Root Mean Square Propagation), Momentum, and stochastic gradient descent (SGD) using the learning model in the first exemplary embodiment and learning data obtained by performing actual measurement. From the viewpoint of the number of times of calculation, stability, and a final error, the highest quality result is obtained in Adam.

FIG. 7B is a diagram illustrating a learning example of a control amount (phase difference) using Adam. It is understood that the output "z" of the learning model in a loop for the first time differs greatly from the control amount "t" of the correct answer data. Upon repetition of the calculation, the output "z" of the learning model in a loop for the 5000th time almost agrees with the control amount "t" of the correct answer data. While, in the present learning example, optimization is performed with the number of times of loop set to 5,000, it is desirable to adjust the number of times of loop as appropriate according to a convergence rate.

Figure 8:
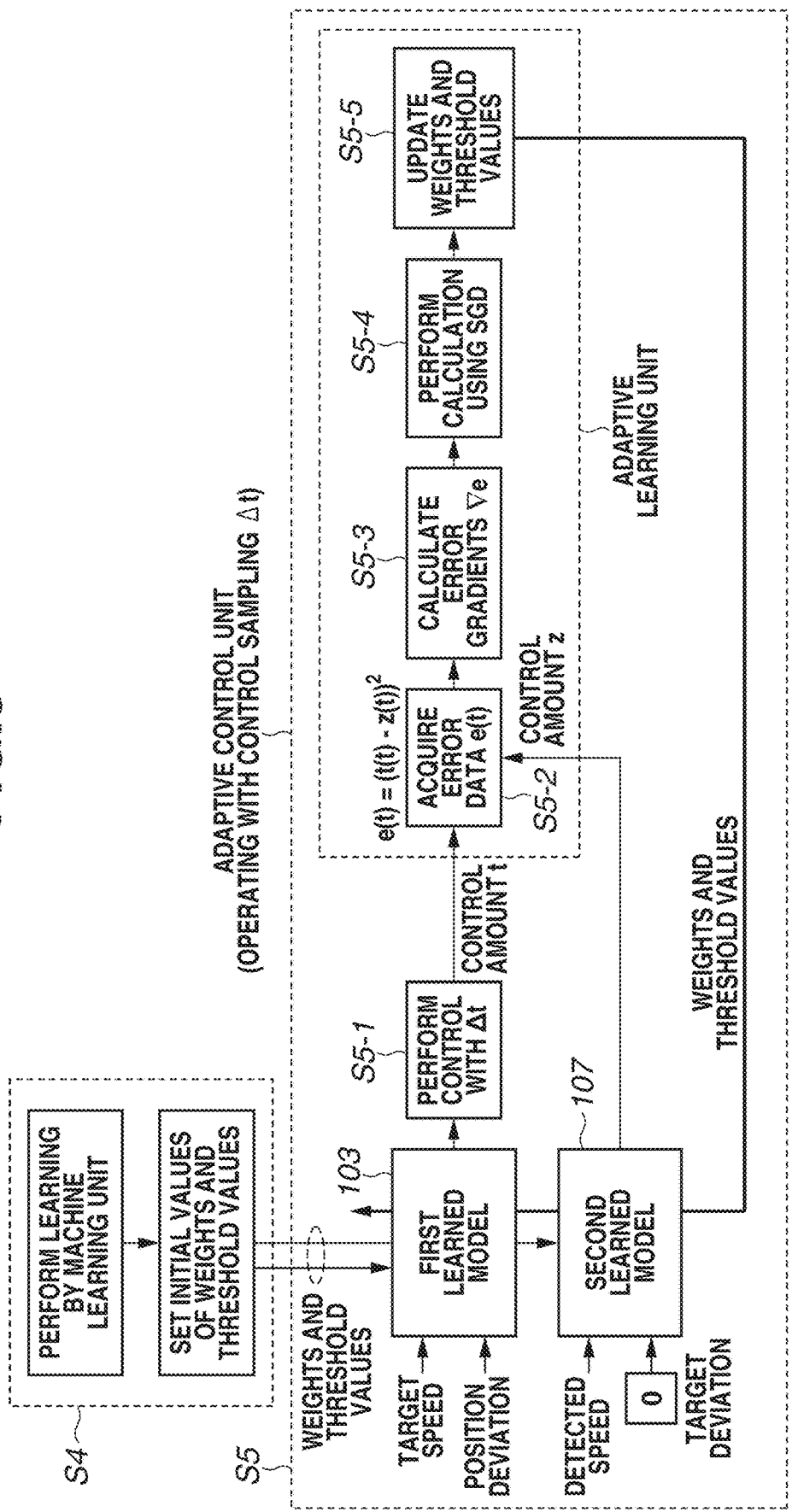
FIG. 8 is a flowchart of adaptive control which an adaptive control unit in the present exemplary embodiment performs.

Next, adaptive control in step S5, which is a characteristic point of the present exemplary embodiment, is described with reference to FIG. 8. FIG. 8 is a flowchart of adaptive control which the adaptive control unit 10 in the present exemplary embodiment performs. In step S4, the adaptive control unit 10 sets the weights and thresholds of the NNs learned by the machine learning unit 12 as initial values of the first learned model 103 and the second learned model 107. In step S5, the adaptive control unit 10 performs adaptive control at every sampling period during driving of the vibration-type actuator, and thus, in step S5, performs updating of parameters using the two learned models.

The first learned model 103 receives, as inputs, the target speed and the position deviation. The second learned model 107 receives, as inputs, the detected speed and the target deviation. Here, the target deviation is set to zero, but, in addition to this, can be given an offset value or a speed deviation as an input. Next, in step S5-1, the adaptive control unit 10 performs control of the vibration-type actuator for one sampling period (Δt) with use of the control amount "t" (first control amount) calculated in the first learned model 103.

In step S5-2, the adaptive control unit 10 calculates a control deviation (t−z), which is a difference between the first control amount "t" and the control amount "z" (second control amount) calculated in the second learned model 107 and having the same data format as that of the first control amount "t", with the first control amount "t" set as correct answer data, and thus acquires error data $e(t)=(t(t)-z(t)))^2$. Furthermore, "t" in (t) denotes predetermined timing and is thus different from the first control amount "t". Here, the second control amount "z" is a control amount output from the second learned model 107 within the same sampling period as that for the first control amount "t". Next, in step S5-3, the adaptive control unit 10 calculates an error gradient ∇E with use of the acquired error data e(t). The error gradient ∇E is calculated with use of differential values of activating functions of the hidden layer and output layer of the NN and input and output values of the respective layers. Next, in step S5-4, the adaptive control unit 10 performs calculation of weights and threshold values of the NN using stochastic gradient descent (SGD), which is one of inverse error propagation methods. Furthermore, the optimization algorithm to be used can include, in addition to SGD, for example, a steepest descent method and a Newton method. Finally, in step S5-5, the adaptive control unit 10 performs updating of weights and threshold values obtained as a result of the calculation. Furthermore, updating of weights and threshold values is performed on the first learned model 103 and the second learned model 107, to which the same parameters are applied at the same timing After that, the adaptive control unit 10 returns the processing to step S5-1 at a next sampling period, and always repeats this control loop during driving. Parameters of the first learned model 103 and parameters of the second learned model 107 can be updated not with the sampling period but with a period longer than the sampling period, for example, a period which is an integral multiple of the sampling period.

FIGS. 10A and 10B are diagrams illustrating results obtained when feedback control is performed with a predetermined target position pattern using an unlearned model and advantageous effects obtained by adaptive control performed in the present exemplary embodiment. The predetermined target position pattern for use in feedback control is a pattern for performing a reciprocating motion with a 5 millimeter (mm) stroke including a positioning motion with trapezoidal driving at a target speed of up to 50 millimeters per second (mm/s). The horizontal axis indicates time (sec), and the vertical axes indicate the target position (left axis) in units of pulses of an encoder and the position deviation (right axis) in units of micrometers (μm).

FIG. 10A illustrates control results obtained without adaptive control being performed. Both results are obtained with use of an unlearned model with weights and threshold values of the NN set in a random function. The present exemplary embodiment is able to significantly improve controllability of an unlearned model by performing adaptive control. In a case where adaptive control is not performed, an unlearned model is naturally not able to follow the target speed. The detected position may greatly deviate from the target position and the position deviation may also be large, so that uncontrollability occurs. Accordingly, it is difficult to acquire high-quality learning data with use of a perfectly unlearned model, and, conventionally, it has been necessary to acquire learning data using a learning model the performance of which has been ensured to some extent or using a different controller such as a proportional-integral-derivative (PID) controller. The adaptive control in the present exemplary embodiment is able to solve this issue, and thus enables acquiring learning data without any trouble even when using an unlearned model.

FIG. 10B illustrates control results obtained by adaptive control in the present exemplary embodiment. A behavior is seen in which, immediately after the start of driving, the detected speed varies with respect to the target speed but, after just 30 milliseconds (ms), the detected speed follows the target speed. This is because, as mentioned above, parameters (weights and threshold values) of two learned models are updated by the adaptive learning unit 108 at every sampling period (0.1 ms) and adaptive control is performed in such a way as to come close to the target speed and the target position.

FIGS. 11A, 11B, and 11C are diagrams illustrating a comparison between results obtained in cases where feedback control is performed with a predetermined target position pattern using PID control and adaptive control performed in the present exemplary embodiment, respectively. The predetermined target position pattern for use in feedback control is a pattern for performing a reciprocating motion with a 5 mm stroke including a positioning motion with trapezoidal driving at a target speed of up to 50 mm/s. The horizontal axis indicates time (sec), and the vertical axes indicate, in order from top down, a phase difference control amount (deg), a detected speed (mm/s), a speed deviation (mm/s), a target position (the number of pulses of an encoder: 8,000 pulses (pls) per 1 mm), and a position deviation (μm).

FIG. 11A illustrates results obtained by the PID control. Here, the frequency (drive frequency) of an alternating-current signal to be applied to the vibration-type actuator 13 is fixed to 93 kHz, and the vibration-type actuator 13 is controlled with only a phase difference. Out of the speed deviation and the position deviation, particularly, the position deviation tends to become larger in acceleration and deceleration regions. This is because the inertia of a driven member which the vibration-type actuator drives affects the position deviation. Moreover, a manner is seen in which it takes a long time before stopping and stabilization of the vibration-type actuator. Furthermore, while, if a PID gain is further increased, it is possible to reduce the position deviation, to ensure robustness with respect to a change in the drive condition (a frequency range of 91 kHz to 95 kHz to be used) or the environmental temperature, a PID control gain having a predetermined gain margin and phase margin is applied.

FIG. 11B illustrates results obtained by adaptive control using the learned models in the present exemplary embodiment (the first learned model 103 and the second learned model 107). Similarly, the drive frequency of an alternating-current signal to be applied to the vibration-type actuator is fixed to 93 kHz, and adaptive control is performed with a learned model which outputs a phase difference. According to the application of the present exemplary embodiment, it is seen that the position deviation improves in all of the regions at acceleration and deceleration and at stopping and stabilization.

FIG. 11C illustrates results obtained by adaptive control using a learned model which outputs a phase difference and a frequency. The drive frequency is fixed to 93 kHz, and, in parallel with the phase difference, the control amount is operated. Furthermore, a control amount for the frequency is an unsigned absolute value, and the drive frequency is always operated to the low-frequency side based on 93 kHz. In a case where there are two control amounts as in the present example, an indefinitely large number of combinations of phase differences and frequencies with which a predetermined speed is able to be obtained in machine learning are conceivable. Accordingly, learning results vary depending on characteristics of learning data to be acquired.

In the present exemplary embodiment, parameters of the NN are set in a random function, and parameters of the NN which exhibit results most excellent in the position deviation and electric power is selected as a result of comparing a plurality of learning results. Besides, for example, learning can be performed after the ratio between a frequency and a phase difference is defined. It is understood that using a phase difference and a frequency as the control amount enables enlarging the speed range of the vibration-type actuator and the position deviation is improved by PID control. Furthermore, in FIGS. 11B and 11C, a change in the phase difference in virtual PID control is shown (the top graph in FIG. 11B and the top graph in FIG. 11C). This is an output of the control amount which is not directly used for control of the vibration-type actuator but is used for PID calculation performed by an observation device based on the position deviation.

Using this PID control amount enables performing abnormality detection of control of the learned model. Thus, comparing the control amount which the learned model outputs with the PID control amount enables predicting that, if there is large deviation from a predetermined range, parameters of the NN deviate from normal values and thus resetting the parameters. The present function is not an essential configuration in attaining advantageous effects of the present exemplary embodiment, but is able to increase reliability in terms of performance assurance of adaptive control using a learned model.

Thus far is a configuration of the control device in the present exemplary embodiment. Furthermore, each of the adaptive control unit 10 and the machine learning unit 12 is configured with a digital device such as a central processing unit (CPU) or a programmable logic device (PLD) (including an application specific integrated circuit (ASIC)) and an element such as an analog-to-digital (A/D) converter. Moreover, the alternating-current signal generation unit 104 of the drive unit 11 includes, for example, a CPU, a function generator, and a switching circuit, and the boosting circuit 105 of the drive unit 11 includes, for example, a coil, a transformer, and a capacitor. Furthermore, each of the adaptive control unit 10 and the drive unit 11 is not only configured with one element or circuit but also can be configured with a plurality of elements or circuits. Moreover, each processing can be performed by any element or circuit. The CPU may be a processor or device that execute instructions to perform operations such as those described in the flowcharts in FIGS. 5 and 8. The instructions may be stored in a memory device or circuit (not shown). The memory may be volatile or non-volatile. Examples of the memory devices are random access memory (RAM), read-only memory (ROM), or flash devices.

FIG. 12 is a diagram illustrating a control device for a vibration-type actuator in a first modification example of the first exemplary embodiment. The first modification example differs from the configuration illustrated in FIG. 1 in not including a machine learning unit and in performing control only by the adaptive control unit 10. Naturally, using a machine learning unit to perform batch learning according to a change in the environmental temperature or drive condition enables obtaining a control function excellent in robustness. However, even if control is performed by only the adaptive control unit 10 as in the present modification example, it is possible to perform control which follows the target speed and the target position to some extent as in results illustrated in FIGS. 10A and 10B.

Figure 13:
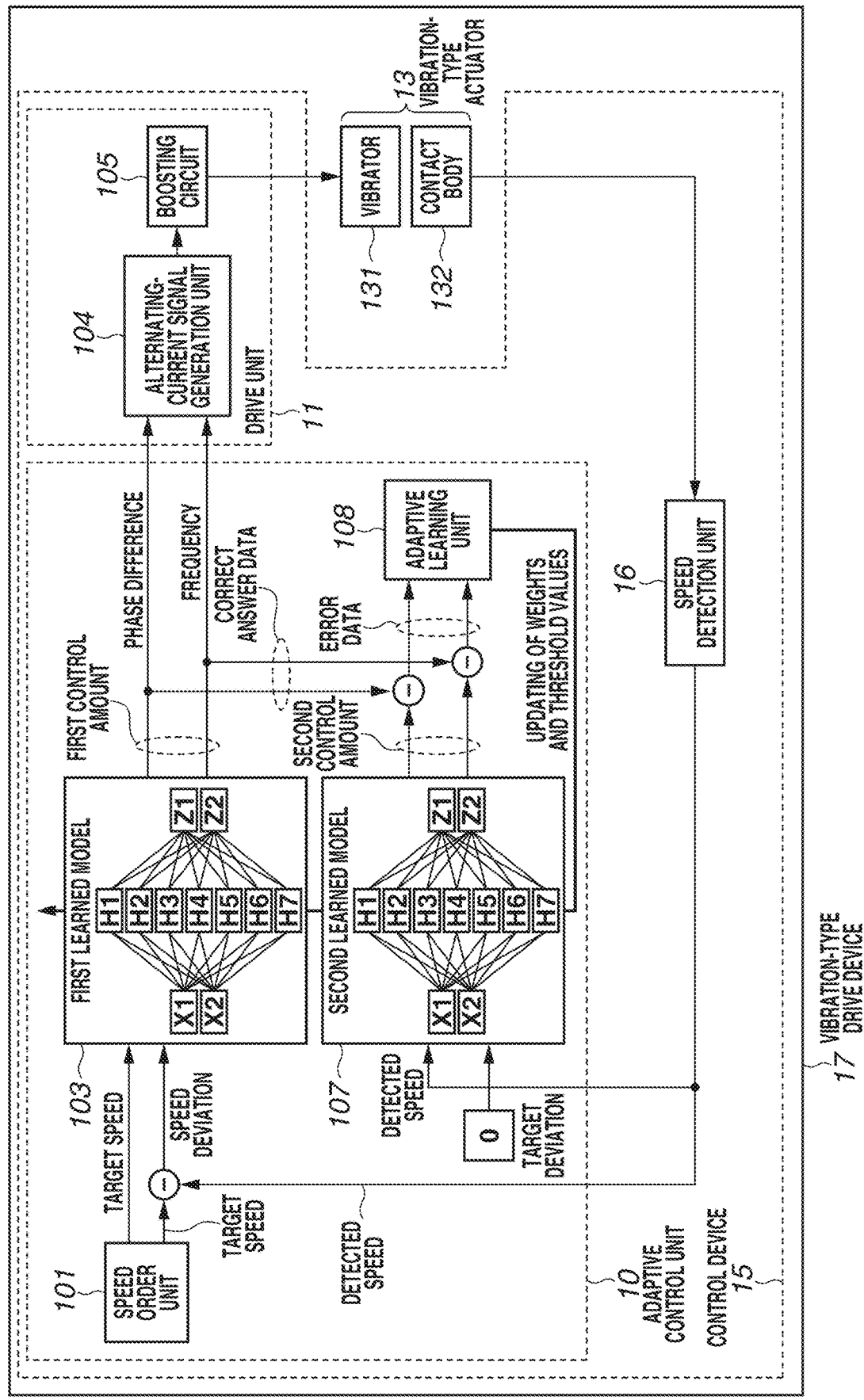
FIG. 13 is a control block diagram of a vibration-type drive device in a second modification example of the first exemplary embodiment.

FIG. 13 is a diagram illustrating a control device for a vibration-type actuator in a second modification example of the first exemplary embodiment. The second modification example differs from the configuration illustrated in FIG. 12 in that the inputs to the first learned model 103 are not the target speed and the position deviation but the target speed and the speed deviation.

Figure 14:
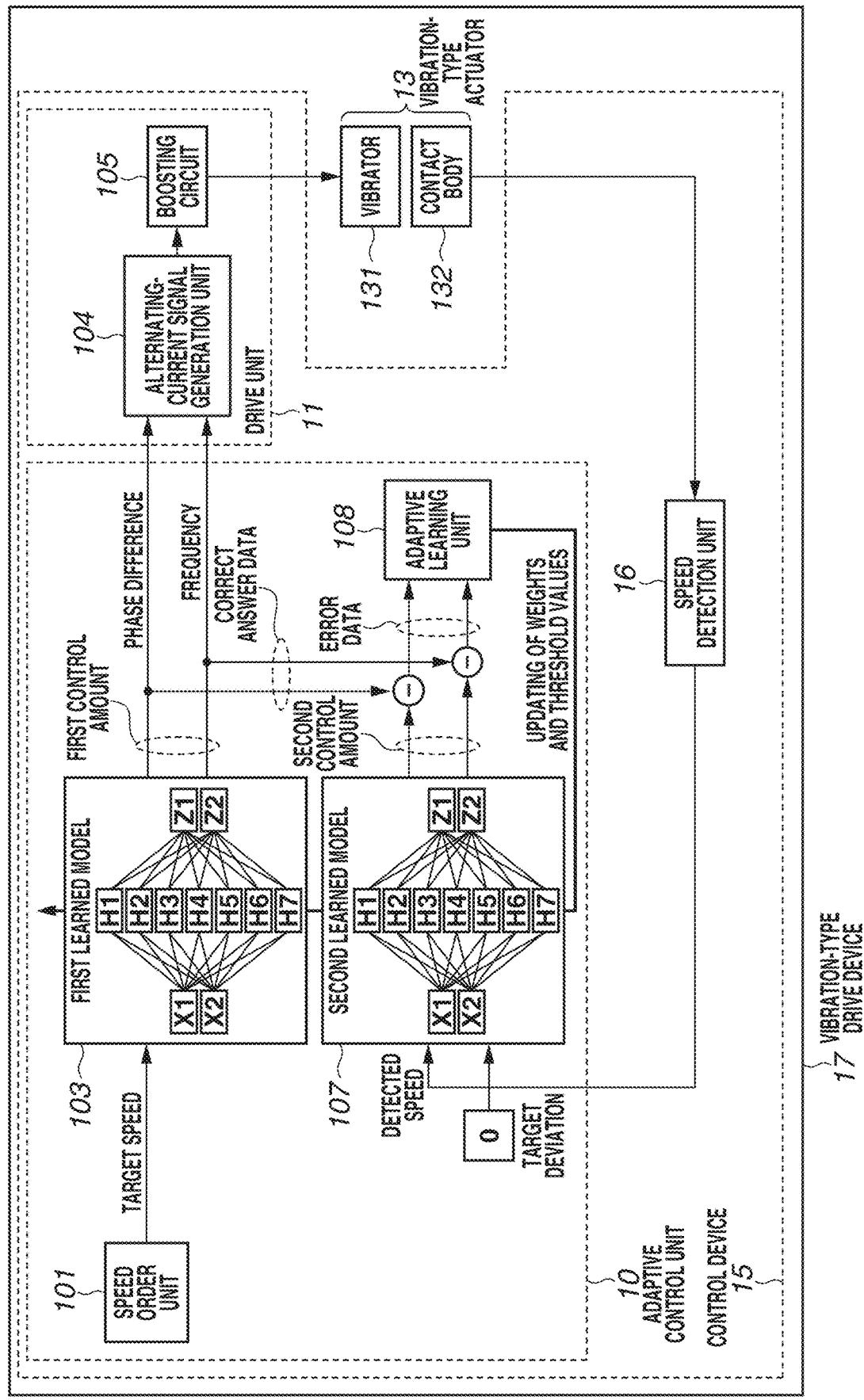
FIG. 14 is a control block diagram of a vibration-type drive device in a third modification example of the first exemplary embodiment.

FIG. 14 is a diagram illustrating a control device for a vibration-type actuator in a third modification example of the first exemplary embodiment. The third modification example differs from the configuration illustrated in FIG. 13 in that the input to the first learned model 103 is only the target speed.

Figure 16:
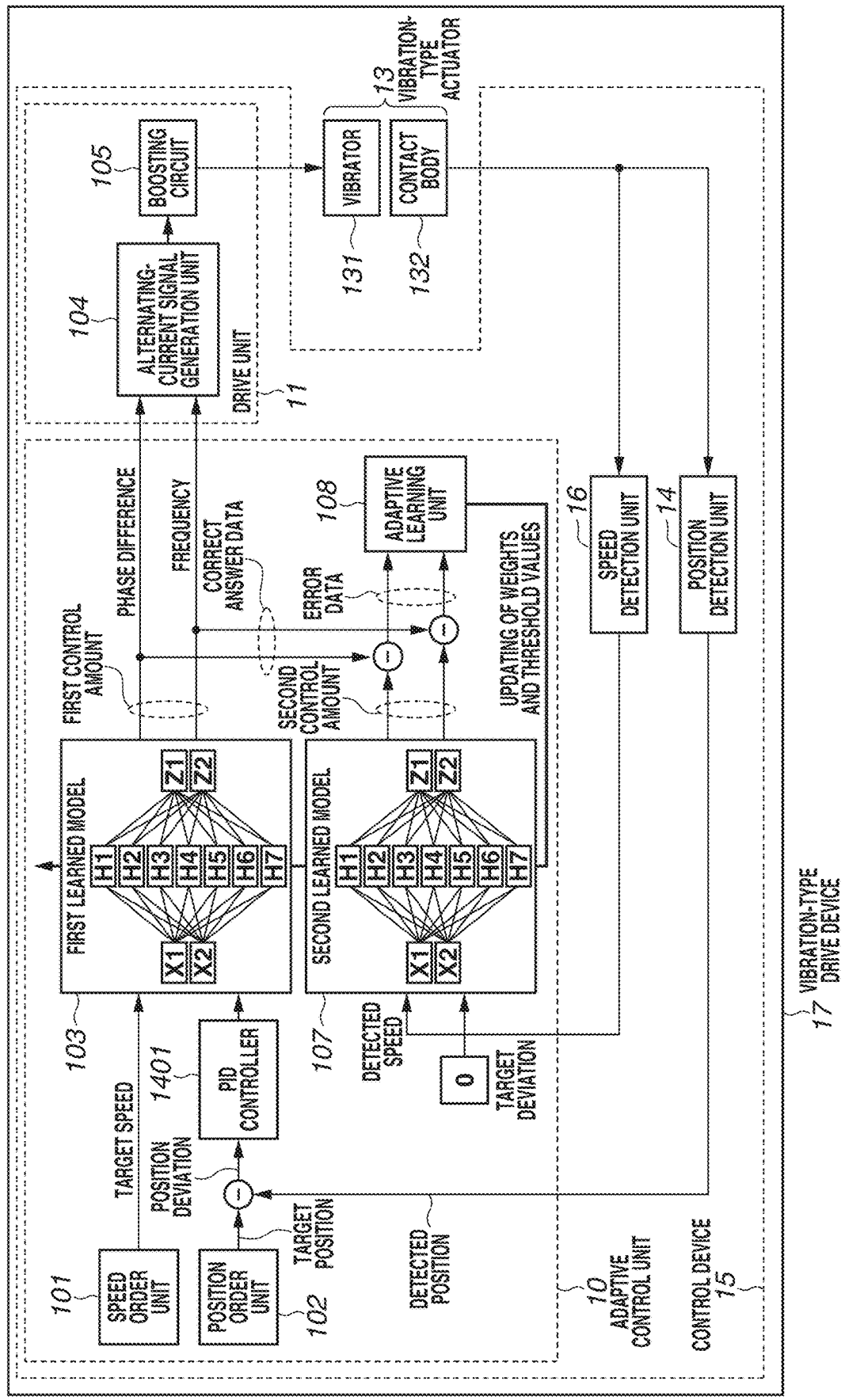
FIG. 16 is a control block diagram of a vibration-type drive device in a second exemplary embodiment (in a case where both the learned models and a PID controller are used together).

A second exemplary embodiment of the control device illustrated in FIG. 1 is described. FIG. 16 is a control block diagram of a vibration-type drive device in the second exemplary embodiment (in a case where both the learned models and the PID controller are used together). In the present control block, feedback control of the vibration-type actuator 13 is performed with use of, for example, a PID controller 1401, the first learned model 103, and the second learned model 107. The position deviation is input to the PID controller 1401, and a result obtained by PID calculation is output from the PID controller 1401. Furthermore, instead of the PID controller 1401, for example, a proportional (P) controller, a proportional-integral (PI) controller, or a proportional-derivative (PD) controller can also be applied. The first learned model 103 receives, as inputs, the target speed and a position deviation obtained by PID calculation.

Applying the second exemplary embodiment enables performing gain adjustment of the position deviation to be input to the first learned model 103, so that it is possible to perform finer adjustment of the control system.

Figure 17:
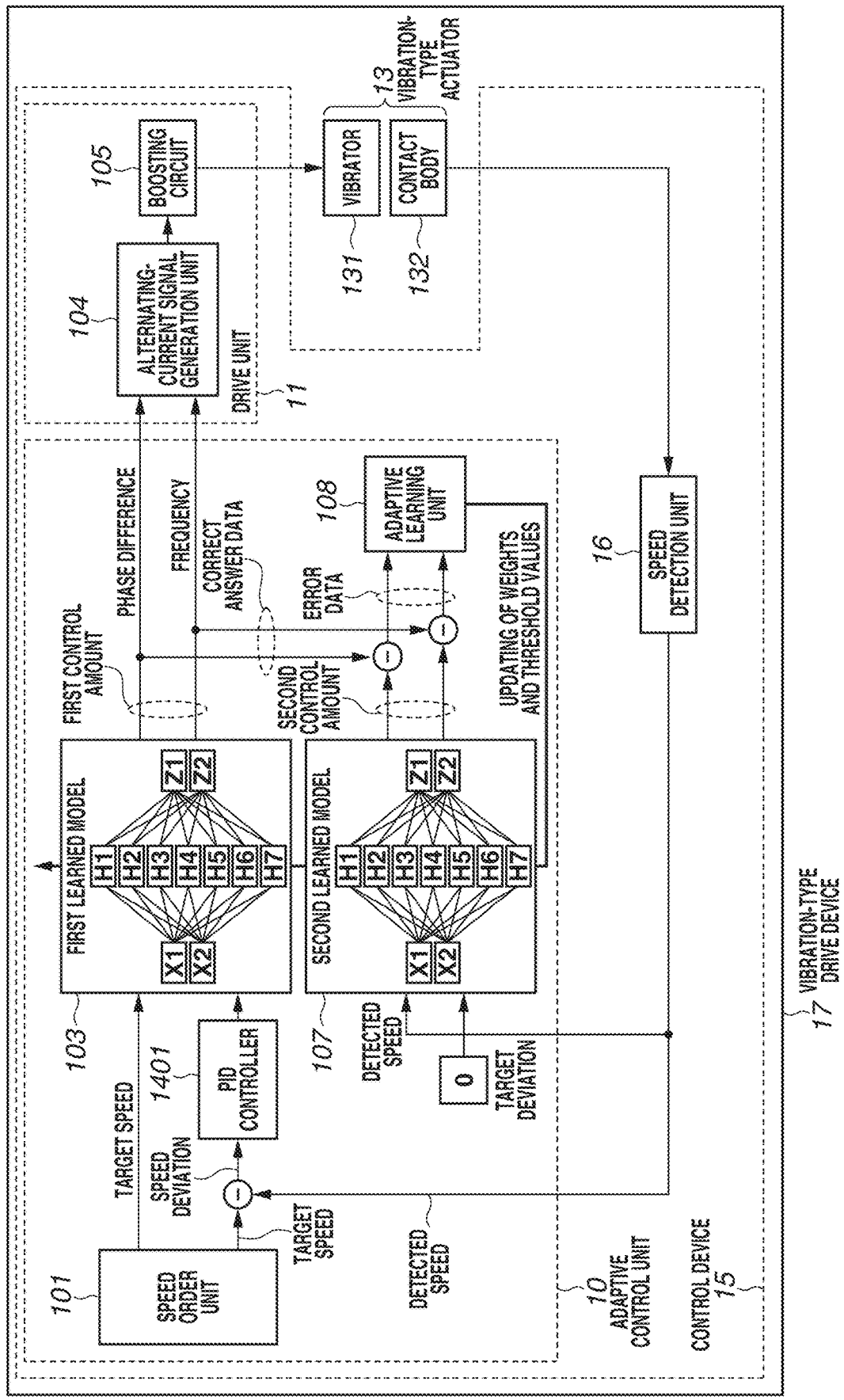
FIG. 17 is a control block diagram of a vibration-type drive device in a modification example of the second exemplary embodiment.

FIG. 17 is a control block diagram of a vibration-type drive device in a modification example of the second exemplary embodiment. In the present control block, feedback control of the vibration-type actuator 13 is performed with use of, for example, the PID controller 1401, the first learned model 103, and the second learned model 107. The speed deviation is input to the PID controller 1401, and a result obtained by PID calculation is output from the PID controller 1401. Furthermore, instead of the PID controller 1401, for example, a P controller, a PI controller, or a PD controller can also be applied. The first learned model 103 receives, as inputs, the target speed and a speed deviation obtained by PID calculation.

Applying the modification example of the second exemplary embodiment enables performing gain adjustment of the speed deviation to be input to the first learned model 103, so that it is possible to perform finer adjustment of the control system.

A third exemplary embodiment of the control device illustrated in FIG. 1 is described.

Figure 18:
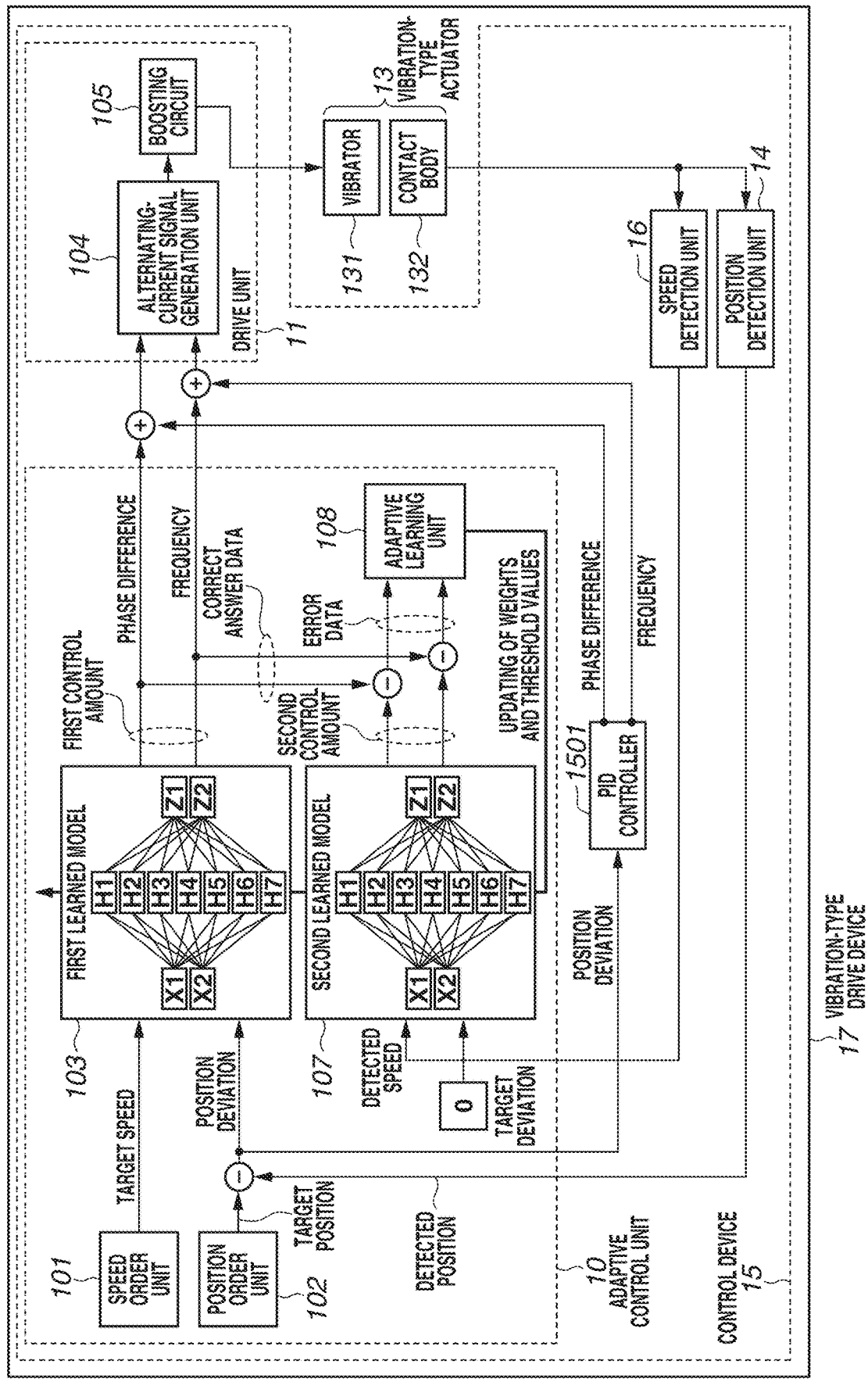
FIG. 18 is a control block diagram of a vibration-type drive device in a third exemplary embodiment (in a case where both the learned models and a PID controller are used together).

FIG. 18 is a control block diagram of a vibration-type drive device in the third exemplary embodiment (in a case where both the learned models and the PID controller are used together). In the present control block, feedback control of the vibration-type actuator 13 is performed with outputs from a PID controller 1501 and a control amount (first control amount) output from the first learned model 103 being added together. The PID controller 1501 receives, as an input, the position deviation and outputs a phase difference and a frequency which have been obtained by PID calculation. Furthermore, instead of the PID controller 1501, for example, a P controller, a PI controller, or a PD controller can also be applied. Moreover, a phase compensator can also be arranged in a stage behind the PID controller 1501. While the target speed and the position deviation are input to the first learned model 103, the position deviation can be set to zero. The first learned model 103 outputs a phase difference and a frequency, to which the phase difference and the frequency output from the PID controller 1501 are respectively added. Furthermore, the machine learning unit 12 can be additionally provided to perform machine learning with use of the control amount obtained by addition and the detected speed detected by the speed detection unit 16.

Applying the third exemplary embodiment enables performing gain adjustment by PID control of the position deviation, so that it is possible to perform finer adjustment of the control system. Moreover, since a comparison with a control result obtained by the PID controller 1501 is able to be performed, it is possible to perform abnormality detection of adaptive control and thus ensure the reliability of the control device.

Figure 19:
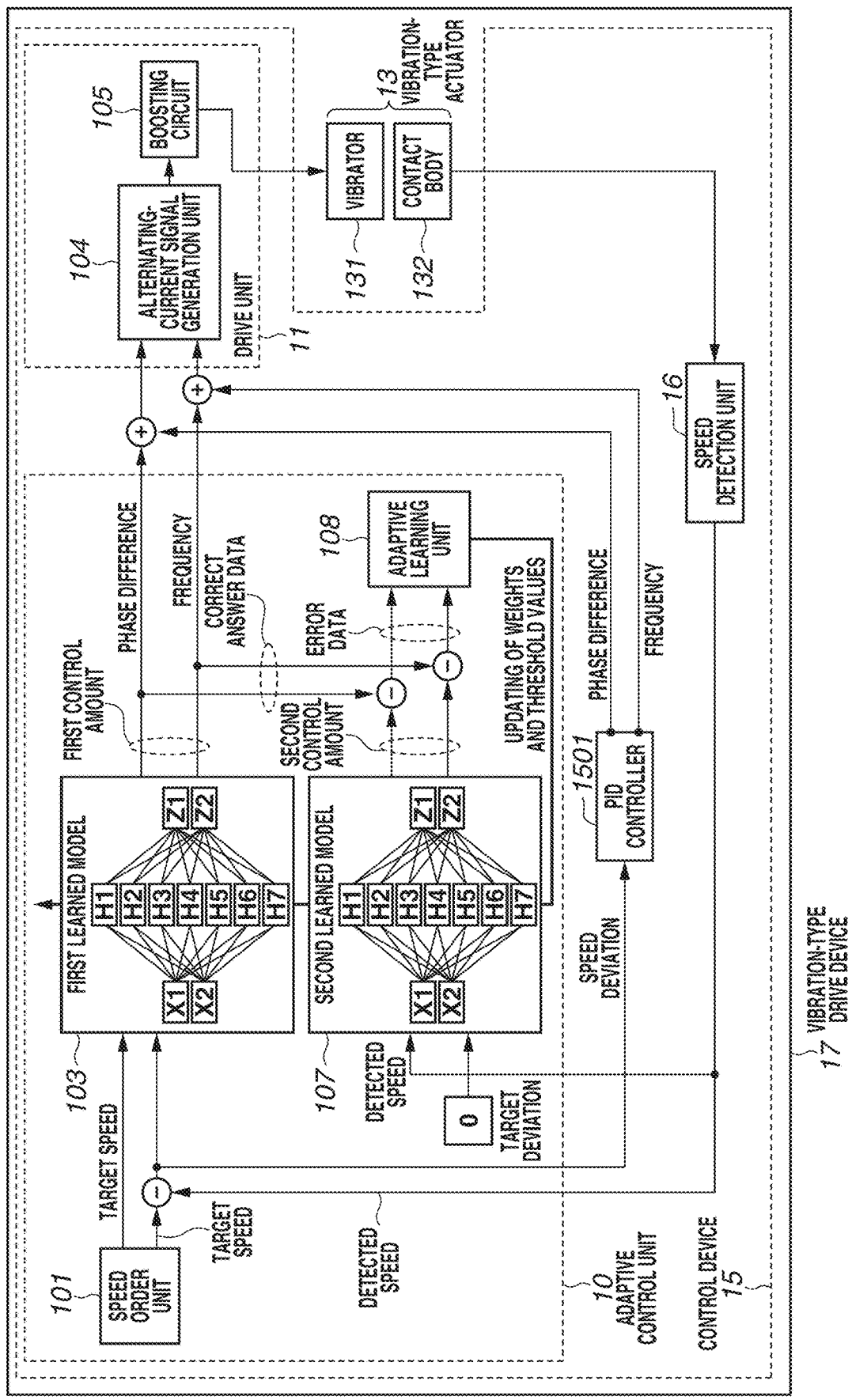
FIG. 19 is a control block diagram of a vibration-type drive device in a modification example of the third exemplary embodiment.

FIG. 19 is a control block diagram of a vibration-type drive device in a modification example of the third exemplary embodiment. In the present control block, feedback control of the vibration-type actuator 13 is performed with outputs from the PID controller 1501 and a control amount (first control amount) output from the first learned model 103 being added together. The PID controller 1501 receives, as an input, the speed deviation and outputs a phase difference and a frequency which have been obtained by PID calculation. Furthermore, instead of the PID controller 1501, for example, a P controller, a PI controller, or a PD controller can also be applied. Moreover, a phase compensator can also be arranged in a stage behind the PID controller 1501. While the target speed and the speed deviation are input to the first learned model 103, the speed deviation can be set to zero. The first learned model 103 outputs a phase difference and a frequency, to which the phase difference and the frequency output from the PID controller 1501 are respectively added. Furthermore, the machine learning unit 12 can be additionally provided to perform machine learning with use of the control amount obtained by addition and the detected speed detected by the speed detection unit 16.

Applying the modification example of the third exemplary embodiment enables performing gain adjustment by PID control of the speed deviation, so that it is possible to perform finer adjustment of the control system. Moreover, since a comparison with a control result obtained by the PID controller 1501 is able to be performed, it is possible to perform abnormality detection of adaptive control and thus ensure the reliability of the control device.

If, in the above-described exemplary embodiments, the control device includes a first control amount output unit including the first learned model and a second control amount output unit including the second learned model, a machine learning unit can be omitted from the control device, as in a vibration-type drive device in a fourth exemplary embodiment. Such a control device has a disadvantage that the first learned model and the second learned model are not able to perform machine learning again, but has an advantage that, in a vibration-type drive device in which the need for performing machine learning again is low, the configuration thereof becomes simplified as much as the machine learning unit is omitted.

In the above-described exemplary embodiments, the vibration-type drive device can be configured to include a storage unit which stores parameters (a first weight, a second weight, a threshold value of a second neuron, and a threshold value of a third neuron) which the learned model has included. Then, the learned model can be subjected to machine learning by parameters included in the learned model being replaced with parameters stored in the storage unit.

Moreover, in the above-described exemplary embodiments, the vibration-type drive device can be configured to include an environment sensor which detects an environmental condition. Then, when a change in environment has been detected by the environment sensor, the learned model can be subjected to machine learning. The environment sensor can be configured to be at least one of a temperature sensor and a humidity sensor.

While, in the first exemplary embodiment, an example in which the control device for a vibration-type actuator is used for driving of a lens for autofocus (a driven member) included in an imaging apparatus, the example of application of the disclosure is not limited to this. For example, as illustrated in FIGS. 20A and 20B, the control device can be used for driving of a lens for image stabilization (a driven member) or an image sensor (a driven member). FIG. 20A is a plan view (top view) illustrating an outer appearance of an imaging apparatus 60. Moreover, FIG. 20B is a schematic diagram of an internal configuration of the imaging apparatus 60.

The imaging apparatus 60 is configured with, in outline, a main body 61 and a lens barrel 62 detachably attached to the main body 61. The main body 61 includes an image sensor 63, such as a charge-coupled device (CCD) sensor or a complementary metal-oxide semiconductor (CMOS) sensor, which converts an optical image formed by light passing through the lens barrel 62 into an image signal, and a camera control microcomputer 64, which controls the overall operation of the imaging apparatus 60. The lens barrel 62 contains a plurality of lenses L, such as a focus lens and a zoom lens, arranged at respective predetermined positions. Moreover, the lens barrel 62 further contains an image stabilization device 50, the image stabilization device 50 includes a circular plate member 56 and a vibrator 131 provided on the circular plate member 56, and an image stabilization lens 65 is arranged in a hole portion formed at a central portion of the circular plate member 56. The image stabilization device 50 is arranged to be able to cause the image stabilization lens 65 to move within a plane perpendicular to the optical axis of the lens barrel 62. In this case, in response to the vibrator 131 being driven by the control device 15 in the present exemplary embodiment, the vibrator 131 and the circular plate member 56 relatively move with respect to a contact body 132 fixed to the lens barrel 62, so that the image stabilization lens 65 (a driven member) is driven.

Moreover, the control device in the present exemplary embodiment can be used for driving of a lens holder (a driven member) for moving a lens for zoom. Accordingly, the control device in the present exemplary embodiment can also be mounted in an interchangeable lens, in addition to the imaging apparatus, for driving of a lens (a driven member).

Moreover, the control device for a vibration-type actuator described in the first exemplary embodiment can also be used for driving of a stage (a driven member). For example, as illustrated in FIG. 21, the control device can also be mounted in an automatic stage included in a microscope.

Figure 21:
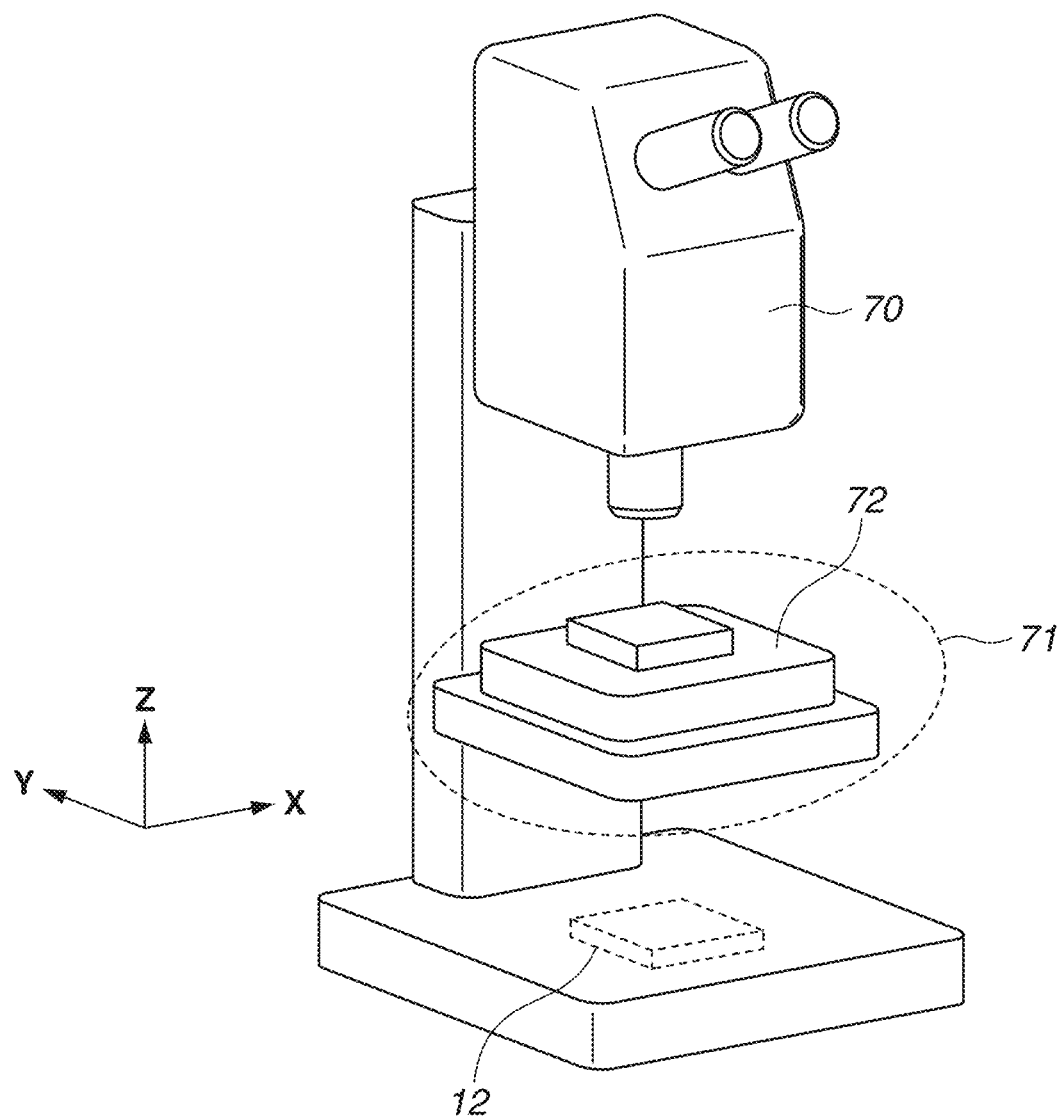
FIG. 21 is a perspective view illustrating an outer appearance of a microscope, which is an example of application of a control device for a vibration-type actuator in a modification example of the fifth exemplary embodiment.

The microscope illustrated in FIG. 21 includes an imaging unit 70, which contains an image sensor and an optical system, and an automatic stage 71 including a stage 72 (a driven member), which is moved by the vibration-type actuator. When a thing for observation is placed on the stage 72, an enlarged image of the thing is captured by the imaging unit 70. In a case where the observation range is a broad range, the vibration-type actuator is driven with use of the control device 15 in the first or second exemplary embodiment to move the stage 72. This causes the thing for observation to move in the X-direction or Y-direction illustrated in FIG. 21 to acquire a great number of captured images. A computer (not illustrated) operates to combine the acquired captured images to acquire a single image the observation range of which is broad and the definition of which is high.

According to aspects of the disclosure, for example, a control device for a vibration-type actuator including, as a main control amount output unit, a control amount output unit different from a conventional PID controller can be provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-180168 filed Oct. 28, 2020, which is hereby incorporated by reference herein in its entirety.

What is claimed is:

1. A control device for a vibration-type actuator, which causes a vibrator to generate a vibration and causes a contact body being in contact with the vibrator to relatively move with respect to the vibrator by the vibration, the control device comprising:
a control unit including:
a first control amount output unit including a first learned model subjected to machine learning in order to output a first control amount for causing the contact body to relatively move with respect to the vibrator in a case where a first speed for causing the contact body to relatively move with respect to the vibrator has been input; and
a second control amount output unit including a second learned model subjected to machine learning in order to output a second control amount, which is data of the same data format as that of the first control amount, in a case where a second speed detected when the contact body has been caused to relatively move with respect to the vibrator by the first control amount has been input,
wherein the control unit updates parameters of the first learned model and parameters of the second learned model based on a control deviation, which is a difference between the first control amount and the second control amount output within the same sampling period as that of the first control amount.

2. The control device according to claim 1,
wherein the first learned model is subjected to machine learning in order to output the first control amount in a case where the first speed and a value that is based on a position deviation, which is a difference between a first position for causing the contact body to relatively move with respect to the vibrator and a second position detected when the contact body has been caused to relatively move with respect to the vibrator by the first control amount, have been input, and
wherein the second learned model is subjected to machine learning in order to output the second control amount in a case where the second speed and a first target deviation, which is data of the same data format as that of a value that is based on the position deviation, have been input.

3. The control device according to claim 1,
wherein the first learned model is subjected to machine learning in order to output the first control amount in a case where the first speed and a value that is based on a speed deviation, which is a difference between the first speed and the second speed, have been input, and
wherein the second learned model is subjected to machine learning in order to output the second control amount in a case where the second speed and a second target deviation, which is data of the same data format as that of a value that is based on the speed deviation.

4. The control device according to claim 1, wherein the control unit acquires the control deviation, acquires an error gradient based on the control deviation, and updates the parameters of the first learned model and the parameters of the second learned model based on the error deviation and an optimization algorithm.

5. The control device according to claim 1, wherein the control unit updates the parameters of the first learned model and the parameters of the second learned model with a period which is an integral multiple of the sampling period.

6. The control device according to claim 2, further comprising a proportional-integral-derivative (PID) controller,
wherein the value that is based on the position deviation is the position deviation or an output from the PID controller obtained in a case where the position deviation has been input to the PID controller.

7. The control device according to claim 3, further comprising a proportional-integral-derivative (PID) controller,
wherein the value that is based on the speed deviation is the speed deviation or an output from the PID controller obtained in a case where the speed deviation has been input to the PID controller.

8. The control device according to claim 1,
wherein each of the first learned model and the second learned model has a neural network configuration including an input layer, which includes one or a plurality of first neurons, a hidden layer, which includes a plurality of second neurons, and an output layer, which includes one or a plurality of third neurons, and
wherein the parameters of the first learned model and the parameters of the second learned model include a plurality of first weights connecting the one or the plurality of first neurons with the plurality of second neurons, a plurality of second weights connecting the plurality of second neurons with the one or the plurality of third neurons, threshold values of the plurality of second neurons, and a threshold value or values of the one or the plurality of third neurons.

9. The control device according to claim 1, further comprising a machine learning unit including a third control amount output unit including a learning model configured to output a third control amount of the same data format as that of the first control amount in a case where the second speed has been input,
wherein the machine learning unit updates parameters of the learning model by machine learning that is based on time-series data about a control deviation, which is a difference between the first control amount and the second control amount detected within the same sampling period as that of the first control amount, and
wherein the control unit updates the parameters of the first learned model and the parameters of the second learned model with the parameters of the learning model.

10. The control device according to claim 2, further comprising a machine learning unit including a learning model configured to output a third control amount of the same data format as that of the first control amount in a case where the second speed and a third target deviation of the same data format as that of the position deviation have been input,
wherein the machine learning unit updates parameters of the learning model by machine learning that is based on time-series data about a control deviation, which is a difference between the first control amount and the second control amount detected within the same sampling period as that of the first control amount, and
wherein the control unit updates the parameters of the first learned model and the parameters of the second learned model with the parameters of the learning model.

11. The control device according to claim 3, further comprising a machine learning unit including a learning model configured to output a third control amount of the same data format as that of the first control amount in a case where the second speed and a fourth target deviation of the same data format as that of the speed deviation have been input,
wherein the machine learning unit updates parameters of the learning model by machine learning that is based on time-series data about a control deviation, which is a difference between the first control amount and the second control amount detected within the same sampling period as that of the first control amount, and
wherein the control unit updates the parameters of the first learned model and the parameters of the second learned model with the parameters of the learning model.

12. The control device according to claim 9, wherein the machine learning unit acquires time-series data about the control deviation, acquires time-series data about an error gradient from the time-series data about the control deviation, and performs machine learning on the parameters of the learning model based on the time-series data about the error gradient and an optimization algorithm.

13. The control device according to claim 9, further comprising an environment sensor configured to detect an environmental condition,
wherein the machine learning unit updates the parameters of the learning model by machine learning in a case where a change in the environmental condition has been detected by the environment sensor.

14. The control device according to claim 9,
wherein the learning model has a neural network configuration including an input layer, which includes one or a plurality of first neurons, a hidden layer, which includes a plurality of second neurons, and an output layer, which includes one or a plurality of third neurons, and
wherein the parameters of the learning model include a plurality of first weights connecting the one or the plurality of first neurons with the plurality of second neurons, a plurality of second weights connecting the plurality of second neurons with the one or the plurality of third neurons, threshold values of the plurality of second neurons, and a threshold value or values of the one or the plurality of third neurons.

15. The control device according to claim 1, wherein the first control amount includes at least one of a phase difference, a frequency, and a pulse width.

16. The control device according to claim 1, further comprising a drive unit configured to output an alternating-current voltage for causing the vibrator to generate a vibration,
wherein the drive unit receives the first control amount as an input.

17. The control device according to claim 1, further comprising:
a drive unit configured to output an alternating-current voltage for causing the vibrator to generate a vibration; and
a proportional-integral-derivative (PID) controller,
wherein the drive unit receives, as an input, a sum of the first control amount and an output from the PID controller obtained in a case where the position deviation has been input to the PID controller.

18. The control device according to claim 1, further comprising:
a drive unit configured to output an alternating-current voltage for causing the vibrator to generate a vibration; and
a proportional-integral-derivative (PID) controller,
wherein the drive unit receives, as an input, a sum of the first control amount and an output from the PID controller obtained in a case where the speed deviation has been input to the PID controller.

19. A vibration-type drive device comprising:
the vibration-type actuator, which causes the vibrator to generate a vibration and causes the contact body being in contact with the vibrator to relatively move with respect to the vibrator by the vibration; and
the control device according to claim 1.

20. An electronic apparatus comprising:
the vibration-type drive device according to claim 19; and
a driven member configured to be driven by the contact body being caused to relatively move with respect to the vibrator.

* * * * *